US008005725B2

(12) United States Patent
Takahashi et al.

(10) Patent No.: US 8,005,725 B2
(45) Date of Patent: Aug. 23, 2011

(54) ORDER SUPPORTING SYSTEM, ORDER SUPPORTING METHOD, AND RECORDING MEDIUM

(75) Inventors: Masato Takahashi, Kanagawa (JP);
Keiji Nagai, Kanagawa (JP); Koji Dan, Kanagawa (JP); Yutaka Nakamura, Kanagawa (JP); Yuuki Inoue, Chiba (JP); Fujio Takahashi, Tokyo (JP); Shogo Hyakutake, Kanagawa (JP); Yoshiaki Murata, Kanagawa (JP); Kenichi Takeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1133 days.

(21) Appl. No.: 11/798,756

(22) Filed: May 16, 2007

(65) Prior Publication Data

US 2007/0280118 A1 Dec. 6, 2007

(30) Foreign Application Priority Data

Jun. 1, 2006 (JP) ................................. 2006-153844
Mar. 30, 2007 (JP) ................................. 2007-093638

(51) Int. Cl.
*G06Q 30/00* (2006.01)
*G06Q 10/00* (2006.01)
(52) U.S. Cl. .......................... 705/26.8; 705/28; 705/26.1
(58) Field of Classification Search .................. 705/26, 705/27, 500, 22, 26.1, 26.8, 28
See application file for complete search history.

(56) References Cited

U.S. PATENT DOCUMENTS

| 5,109,486 A | 4/1992 | Seymour |
| 5,652,839 A | 7/1997 | Giorgio et al. |
| 6,430,711 B1* | 8/2002 | Sekizawa ........................ 714/47 |
| 6,529,692 B1* | 3/2003 | Haines et al. .................... 399/27 |
| 7,340,501 B2* | 3/2008 | Miida et al. ..................... 709/203 |
| 7,395,316 B2* | 7/2008 | Ostertag et al. ................. 709/207 |
| 2002/0049839 A1* | 4/2002 | Miida et al. ..................... 709/224 |
| 2002/0095495 A1 | 7/2002 | Otsuka et al. |
| 2003/0110103 A1 | 6/2003 | Sesek et al. |

(Continued)

FOREIGN PATENT DOCUMENTS

EP    0 843 229 A2    5/1998

(Continued)

OTHER PUBLICATIONS

Anon., "Instantly re-order toner cartridges online using hp's smartchip," M2 Presswire, Oct. 19, 2001.*

(Continued)

*Primary Examiner* — Nicholas D Rosen
(74) *Attorney, Agent, or Firm* — Dickstein Shapiro LLP

(57) ABSTRACT

An order supporting system includes a machine monitoring apparatus including an obtaining part for repetitively obtaining status data of plural supplies of plural machines connected to a network, a storing part for storing the status data obtained by the obtaining part, a detecting part for detecting change in the status of the supply by comparing the status data stored in the storing part and new status data that is newly obtained by the obtaining part, and a transmitting part for transmitting status data corresponding to the supply of the machine from which status change is detected by the detecting part, and an order supporting apparatus for receiving the status data transmitted from the transmitting part via the network and transmitting an electronic mail to a mail address associated to the machine corresponding to the transmitted status data in accordance with the received status data.

9 Claims, 20 Drawing Sheets

U.S. PATENT DOCUMENTS

| | | |
|---|---|---|
| 2004/0184064 A1 | 9/2004 | TaKeda et al. |
| 2004/0186821 A1* | 9/2004 | Matson et al. ................ 707/1 |
| 2005/0074246 A1 | 4/2005 | Hayward et al. |
| 2005/0146755 A1 | 7/2005 | Shimokawa et al. |
| 2006/0039707 A1* | 2/2006 | Mima ........................ 399/23 |
| 2006/0085279 A1 | 4/2006 | Lee |
| 2006/0279776 A1* | 12/2006 | Akiyama ................ 358/1.15 |

FOREIGN PATENT DOCUMENTS

| | | |
|---|---|---|
| EP | 1 294 127 A1 | 3/2003 |
| EP | 1 331 521 A2 | 7/2003 |
| GB | 2 361 140 A | 10/2001 |
| GB | 2 371 129 A | 7/2002 |
| JP | 10-198236 | 7/1998 |
| JP | 2003-345560 | 12/2003 |
| JP | 2004-287496 | 10/2004 |
| JP | 2005-190490 | 7/2005 |
| JP | 2005-205638 A * | 8/2005 |
| WO | WO 2004/029727 A1 | 4/2004 |

OTHER PUBLICATIONS

Anon., "New Dell TV's, Printers and Music Players; Product Information Sheet," Business Wire, Oct. 14, 2004.*

* cited by examiner

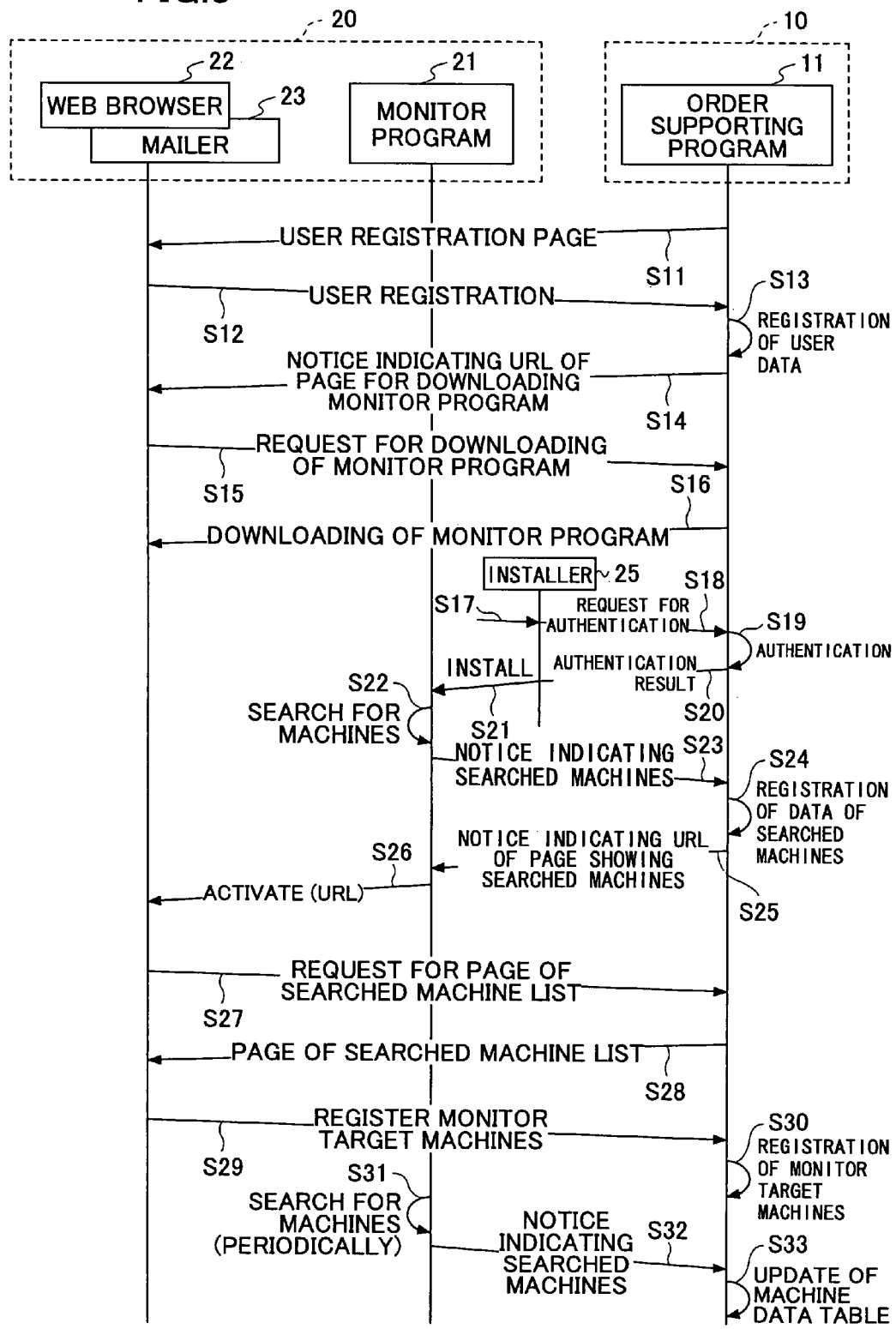

FIG.4

USER REGISTRATION PAGE

| | | |
|---|---|---|
| CUSTOMER NAME | ☐ | ~221 |
| REQUISITE) POSTAL CODE | ☐ | ~222 |
| REQUISITE) ADDRESS | ☐ | ~223 |
| REQUISITE) COMPANY NAME | ☐ | ~224 |
| DEPARTMENT NAME | ☐ | ~225 |
| REQUISITE) TELEPHONE NUMBER | ☐ | ~226 |
| FACSIMILE NUMBER | ☐ | ~227 |
| REQUISITE) E-MAIL ADDRESS | ☐ | ~228 |

DELIVERY DESTINATION
(PLEASE INDICATE IF DIFFERENT FROM ABOVE ADDRESS)

| | | |
|---|---|---|
| POSTAL CODE | ☐ | |
| ADDRESS | ☐ | 231 |
| COMPANY NAME | ☐ | |
| DEPARTMENT NAME | ☐ | |
| REQUISITE) DISTRIBUTOR ID | ☐ | ~232 |

[REGISTER] ~233

| MAC ADDRESS | VENDOR NAME | MODEL NAME | SERIAL NUMBER | MONITOR FLAG | COMMENTS | ... | SUPPLY STATUS | | | | | MAIL FLAG |
|---|---|---|---|---|---|---|---|---|---|---|---|---|
| | | | | | | | C | M | Y | K | Any | ... | |
| 00.00.74.71.42.0a | A | A7200 | 123456 | Yes | | | N | N | N | N | N | ... | No |
| 00.30.c1.00.04.43 | B | B LaserJet 8500 | 00.30.c.1.00.04.43 | Yes | | | N | N | N | N | N | ... | No |
| 00.04.00.f0.0c.0e | C | CL2455 | 00.04.00.f0.0c.0e | Yes | | | N | N | N | N | N | ... | No |
| 00.10.83.a3.d4.1c | B | B LaserJet4050 | 00.10.83.a3.d4.1c | Yes | | | N | N | N | N | N | ... | No |
| 00.10.83.bb.57.0e | B | B LaserJet4050 | 00.10.83.bb.57.0e | Yes | | | N | N | N | N | N | ... | No |
| 00.30.c1.0c.f4.c7 | B | B LaserJet4050 | 00.30.c1.0c.f4.c7 | Yes | | | N | N | N | N | N | ... | No |
| 00.00.74.71.42.1b | A | A3228C | P6020101199 | | | | .. | .. | .. | .. | .. | .. | .. |
| .. | .. | | | | | | | | | | | | |

RETRIEVED MACHINE LIST 240

| # | SERIAL NUMBER | MAC ADDRESS | IP ADDRESS | MODEL NAME | VENDOR NAME | COMMENTS 241 | MONITOR TARGET 242 |
|---|---|---|---|---|---|---|---|
| 1 | 123456 | 00.00.74.71.42.0a | xxxxxxxxxxx | A7200 | A | | ☐ |
| 2 | 00.30.c1.00.04.43 | 00.30.c1.00.04.43 | xxxxxxxxxxx | B LaserJet 8500 | B | | ☐ |
| 3 | 00.04.00.f0.0c.0e | 00.04.00.f0.0c.0e | xxxxxxxxxxx | CL2455 | C | | ☐ |
| 4 | 00.10.83.a3.d4.1c | 00.10.83.a3.d4.1c | xxxxxxxxxxx | B LaserJet 4050 | B | | ☐ |
| 5 | 00.10.83.bb.57.0e | 00.10.83.bb.57.0e | xxxxxxxxxxx | B LaserJet 4050 | B | | ☐ |
| 6 | 00.30.c1.0c.f4.c7 | 00.30.c1.0c.f4.c7 | xxxxxxxxxxx | B LaserJet 4050 | B | | ☐ |
| 7 | P60201101199 | 00.00.74.71.42.1b | xxxxxxxxxxx | A3228C | A | | ☐ |

TRANSMIT 243

FIG.7

| MAC ADDRESS | VENDOR NAME | MODEL NAME | SERIAL NUMBER | MONITOR FLAG | COMMENTS | ... | SUPPLY STATUS | | | | | MAIL FLAG |
|---|---|---|---|---|---|---|---|---|---|---|---|---|
| | | | | | | | C | M | Y | K | Any | |
| 00.00.74.71.42.0a | A | A7200 | 123456 | Yes | OOMORI 4F | | N | N | N | N | N | ... | No |
| 00.30.c.1.00.04.43 | B | B LaserJet 8500 | 00.30.c.1.00.04.43 | Yes | | | N | N | N | N | N | ... | No |
| 00.04.00.f0.0c.0e | C | CL2455 | 00.04.00.f0.0c.0e | Yes | | | N | N | N | N | N | ... | No |
| 00.10.83.a3.d4.1c | B | B LaserJet4050 | 00.10.83.a3.d4.1c | Yes | | | N | N | N | N | N | ... | No |
| 00.10.83.bb.57.0e | B | B LaserJet4050 | 00.10.83.bb.57.0e | No | | | N | N | N | N | N | ... | No |
| 00.30.c1.0c.f4.c7 | B | B LaserJet4050 | 00.30.c1.0c.f4.c7 | No | | | N | N | N | N | N | ... | No |
| 00.00.74.71.42.1b | A | A3228C | P6020101199 | | | | .. | .. | .. | .. | .. | .. | .. |
| .. | .. | | | | | | | | | | | |

| MAC ADDRESS | VENDOR NAME | MODEL NAME | SERIAL NUMBER | MONITOR FLAG | COMMENTS | ... | SUPPLY STATUS | | | | | MAIL FLAG |
|---|---|---|---|---|---|---|---|---|---|---|---|---|
| | | | | | | | C | M | Y | K | Any | ... |
| 00.00.74.71.42.0a | A | A7200 | 123456 | Yes | OOMORI 4F | | N | N | N | N | N | No |
| 00.30.c.1.00.04.43 | B | B LaserJet 8500 | 00.30.c.1.00.04.43 | Yes | | | N | N | N | N | N | No |
| 00.04.00.f0.0c.0e | C | CL2455 | 00.04.00.f0.0c.0e | Yes | | | N | N | N | N | N | No |
| 00.10.83.a3.d4.1c | B | B LaserJet4050 | 00.10.83.a3.d4.1c | Yes | | | N | N | N | N | N | No |
| 00.10.83.bb.57.0e | B | B LaserJet5000 | 00.10.83.bb.57.0e | Yes | | | N | N | N | N | N | No |
| 00.30.c1.0c.f4.c7 | B | B LaserJet4050 | 00.30.c1.0c.f4.c7 | No | | | N | N | N | N | N | No |
| 00.00.74.71.42.1b | A | A3228C | P6020101199 | No | | | .. | .. | .. | .. | .. | .. |
| .. | .. | | .. | | | | | | | | | |

| MAC ADDRESS | VENDOR NAME | MODEL NAME | SERIAL NUMBER | COMMENTS | MONITOR STATUS | SUPPLY STATUS | REPORT FLAG |
|---|---|---|---|---|---|---|---|
| 00.00.74.71.42.0a | A | A7200 | 123456 | OOMORI 4F | OK | normal | REPORTED |
| 00.30.c.1.00.04.43 | B | B LaserJet 8500 | 00.30.c.1.00.04.43 | | OK | normal | REPORTED |
| 00.04.00.f0.0c.0e | C | CL2455 | 00.04.00.f0.0c.0e | | OK | end | UNREPORTED |
| 00.10.83.a3.d4.1c | B | B LaserJet4050 | 00.10.83.a3.d4.1c | | OK | near end | REPORTED |
| 00.10.83.bb.57.0e | B | B LaserJet5000 | 00.10.83.bb.57.0e | | OK | near end | REPORTED |

FIG.12

| MAC ADDRESS | VENDOR NAME | MODEL NAME | SERIAL NUMBER | COMMENTS | MONITOR STATUS | SUPPLY STATUS | REPORT FLAG |
|---|---|---|---|---|---|---|---|
| 00.00.74.71.42.0a | A | A7200 | 123456 | OOMORI 4F | OK | near end | UNREPORTED |
| 00.30.c.1.00.04.43 | B | B LaserJet 8500 | 00.30.c.1.00.04.43 | | NG | normal | REPORTED |
| 00.04.00.f0.0c.0e | C | CL2455 | 00.04.00.f0.0c.0e | | OK | end | UNREPORTED |
| 00.10.83.a3.d4.1c | B | B LaserJet4050 | 00.10.83.a3.d4.1c | | OK | end | UNREPORTED |
| 00.10.83.bb.57.0e | B | B LaserJet5000 | 00.10.83.bb.57.0e | | OK | near end | REPORTED |

| REPORT DATA | COMMENTS | FOOTNOTE |
|---|---|---|
| [ Header ] | 【HEADER DATA】 | |
| Date&Time | DATE AND TIME | |
| User ID | USER ID FOR TRANSMITTING TO SERVER | DATA IDENTIFYING USER |
| Password | PASSWORD FOR TRANSMITTING TO SERVER | |
| | | |
| [ Device Info ] | 【MACHINE DATA】 | |
| Vendor name | VENDOR NAME OF MACHINE | |
| Model name | MODEL NAME OF MACHINE | |
| Serial Number | SERIAL NUMBER | |
| Mac Address | MAC ADDRESS | |
| IP Address | IP ADDRESS | |
| Toner ID | TONER ID | |
| Toner Name | TONER NAME | |
| Toner Status | TONER STATUS | |
| Toner Level | TONER LEVEL | |
| Toner Name Localized | TONER NAME (CHARACTER STRING) | |
| Toner Name Localized Code | TONER NAME (CODE) | |
| Total Counter | TOTAL COUNTER VALUE | |
| Monochrome Counter | MONOCHROME COUNTER VALUE | (*1) |
| Color Counter | COLOR COUNTER VALUE | (*1) |
| Cyan Counter | CYAN COUNTER VALUE | (*1) |
| Magenta Counter | MAGENTA COUNTER VALUE | (*1) |
| Yellow Counter | YELLOW COUNTER VALUE | (*1) |
| Black Counter | BLACK COUNTER VALUE | (*1) |
| Red Counter | RED COUNTER VALUE | (*1) |

DESTINATION: <MAIL ADDRESS OF USER CORRESPONDING TO SHORTAGE REPORT DATA>
TITLE: <TITLE INDICATING SHORTAGE REPORT MAIL>
MAIN TEXT: <DATA REGARDING MACHINE
(VENDOR NAME, MODEL NAME, COMMENTS) >
<DATA INDICATING STATUS OF SHORT SUPPLY, AND SUPPLY DATA>
<URL OF ORDER PAGE>
(EXAMPLE: http://www.rrrsupply.com)

FIG.15

| MAC ADDRESS | VENDOR NAME | MODEL NAME | SERIAL NUMBER | COMMENTS | MONITOR STATUS | SUPPLY STATUS | REPORT FLAG |
|---|---|---|---|---|---|---|---|
| 00.00.74.71.42.0a | A | A7200 | 123456 | OOMORI 4F | OK | near end | REPORTED |
| 00.30.c.1.00.04.43 | B | B LaserJet 8500 | 00.30.c.1.00.04.43 | | NG | normal | REPORTED |
| 00.04.00.f0.0c.0e | C | CL2455 | 00.04.00.f0.0c.0e | | OK | end | UNREPORTED |
| 00.10.83.a3.d4.1c | B | B LaserJet4050 | 00.10.83.a3.d4.1c | | OK | end | UNREPORTED |
| 00.10.83.bb.57.0e | B | B LaserJet5000 | 00.10.83.bb.57.0e | | OK | near end | REPORTED |

ORDER PAGE

CONSUMABLE SUPPLY OF BELOW MACHINE IS SHORT

| MANUFACTURER NAME | MODEL NAME | SERIAL NUMBER | COMMENTS |
|---|---|---|---|
| A | A 7200 | 123456 | SOUTH SIDE 6F |

— 261

SHORT CONSUMABLE SUPPLY — 262
A IP TONER (YELLOW)

PLEASE ENTER NUMBER OF ITEMS OF NECESSARY SUPPLIES
※PRODUCT INFO. CAN BE VIEWED BY CLICKING PRODUCT NAME

— 262

| PRODUCT NAME | PRODUCT CODE | UNIT COST (TAX EXCLUDED) | QUANTITY | SUM |
|---|---|---|---|---|
| A IP TONER (CYAN) | 636341 | ¥27,000 | 0 | ¥0 |
| A IP TONER (MAGENTA) | 636340 | ¥27,000 | 0 | ¥0 |
| A IP TONER (YELLOW) | 636339 | ¥27,000 | 1 ~2621 | ¥28,350 |
| A IP TONER (BLACK) | 636338 | ¥32,000 | 0 | ¥0 |
| A DEVELOPMENT UNIT COLOR TYPE 7200 | 509626 | ¥22,500 | 0 | ¥0 |
| A FIXING OIL UNIT TYPE 7200 | 509259 | ¥6,000 | 0 | ¥0 |
| | | | TOTAL | ¥28,350 |

[ORDER] ~2622

PURCHASE HISTORY FOR SUPPLIES OF A A 7200 (S/N:123456)
2005/12/10  A IP TONER (CYAN)        ONE ITEM    ORDERED
2005/11/21  A IP TONER (MAGENTA)     ONE ITEM  —263 DELIVERED
2005/09/30  A IP TONER (BLACK)       ONE ITEM    DELIVERED

ORDER SUPPORTING SYSTEM, ORDER SUPPORTING METHOD, AND RECORDING MEDIUM

BACKGROUND OF THE INVENTION

1. Field of the Invention

The present invention provides an order supporting system, an order supporting method, and a recording medium, and more particularly to an order supporting system, an order supporting method, and a recording medium for supporting the ordering of supplies of machines.

2. Description of the Related Art

Inside an office of a company, numerous machines (apparatuses), such as a printer, a copy machine, a fax machine, or a multi-function machine having the functions of the foregoing machines, are connected via a network.

All the above-described machines include consumable supplies that are consumed when using the machines. The functions of the machines can be maintained by appropriately exchanging the consumable supply (hereinafter also referred to as "supply"). For example, a consumable supply for a printer may be a toner, a fixing unit, a disposal toner bottle, a photoconductor, or a developer.

For example, since it is difficult to determine the degree of consumption (wear) of the machines just by looking at the machines from the outside, the user is able to recognize shortage of a supply (in this example, toner) and the need to exchange the toner only when an error is reported to the user upon commanding a printing operation. In order to reduce the workload of the user, various methodologies are proposed. For example, there is a methodology of detecting the lifespan of a supply from the inside of the machine and indicating data of the supply on a control panel or printing out the data of the supply onto a sheet of paper. Furthermore, there is a methodology of reporting the need of exchanging a supply to the outside by transmitting signals and dispatching maintenance personnel to offices where the machines are installed.

In a case where ordering a supply or exchanging a supply is performed by the user itself when shortage of the lifespan of the supply is detected, the user is required to confirm the precise model number of the supply when ordering the supply. Therefore, the user must go through complicated procedures in order to order the supply. Furthermore, in a case of ordering a supply beforehand, the timing for ordering the supply may vary depending on business hours or business days of the sales office for receiving the order. Furthermore, in an ordering system where maintenance personnel are dispatched, there is a problem of increasing costs such as labor cost and delivery cost.

SUMMARY OF THE INVENTION

The present invention may provide an order supporting system, an order supporting method, and a recording medium that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an order supporting system, an order supporting method, and a recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an order supporting system including: a machine monitoring apparatus including a status data obtaining part for repetitively obtaining status data of a plurality of supplies of a plurality of machines connected to a network, a status data storing part for storing the status data obtained by the status data obtaining part, a status change detecting part for detecting change in the status of the supply by comparing the status data stored in the status data storing part and new status data that is newly obtained by the status data obtaining part, and a status data transmitting part for transmitting status data corresponding to the supply of the machine from which status change is detected by the status change detecting part; and an order supporting apparatus for receiving the status data transmitted from the status data transmitting part via the network and transmitting an electronic mail to a mail address associated to the machine corresponding to the transmitted status data in accordance with the received status data.

Furthermore, another embodiment of the present invention provides an order supporting method including the steps of: causing a first computer to execute the steps of a) repetitively obtaining status data of a plurality of supplies of a plurality of machines connected to a network, b) storing the status data obtained in step a), c) detecting change in the status of the supply by comparing the status data stored in the status data storing part and new status data that is newly obtained in step a), and d) transmitting status data corresponding to the supply of the machine from which status change is detected in step c); and causing a second computer to execute the steps of e) receiving the status data transmitted in step d) via the network, and f) transmitting an electronic mail to a mail address associated to the machine corresponding to the transmitted status data in accordance with the received status data.

Other objects and further features of the present invention will be apparent from the following detailed description when read in conjunction with the accompanying drawings.

BRIEF DESCRIPTION OF THE DRAWINGS

FIG. 3 is a sequence diagram for describing procedures executed upon user registration with an order supporting system according to an embodiment of the present invention;

FIG. 4 is a schematic diagram showing an example of the user registration page being displayed according to an embodiment of the present invention;

FIG. 5 is an exemplary configuration of a machine data table included in a machine database according to an embodiment of the present invention;

FIG. 6 is an example of a searched machine data list page according to an embodiment of the present invention;

FIG. 7 is an example of a machine data table having a monitoring necessity and a comment registered therein according to an embodiment of the present invention;

FIG. 9 shows an example of updating a machine data table in a case where there is an entry having a mismatching model name according to an embodiment of the present invention;

FIG. 11 is an exemplary configuration of a cache table according to an embodiment of the present invention;

FIG. 12 is an example of updating a cache table based on the results of polling for machine data according to an embodiment of the present invention;

FIG. 13 is a schematic diagram showing an exemplary configuration of status change data according to an embodiment of the present invention;

FIG. 15 is an updated cache table in a case where status change data are properly processed according to an embodiment of the present invention;

FIG. 16 is an example of an order page according to an embodiment of the present invention;

DESCRIPTION OF THE PREFERRED EMBODIMENTS

In the following, embodiments of the present invention will be described with reference to the accompanying drawings.

Figure 1:
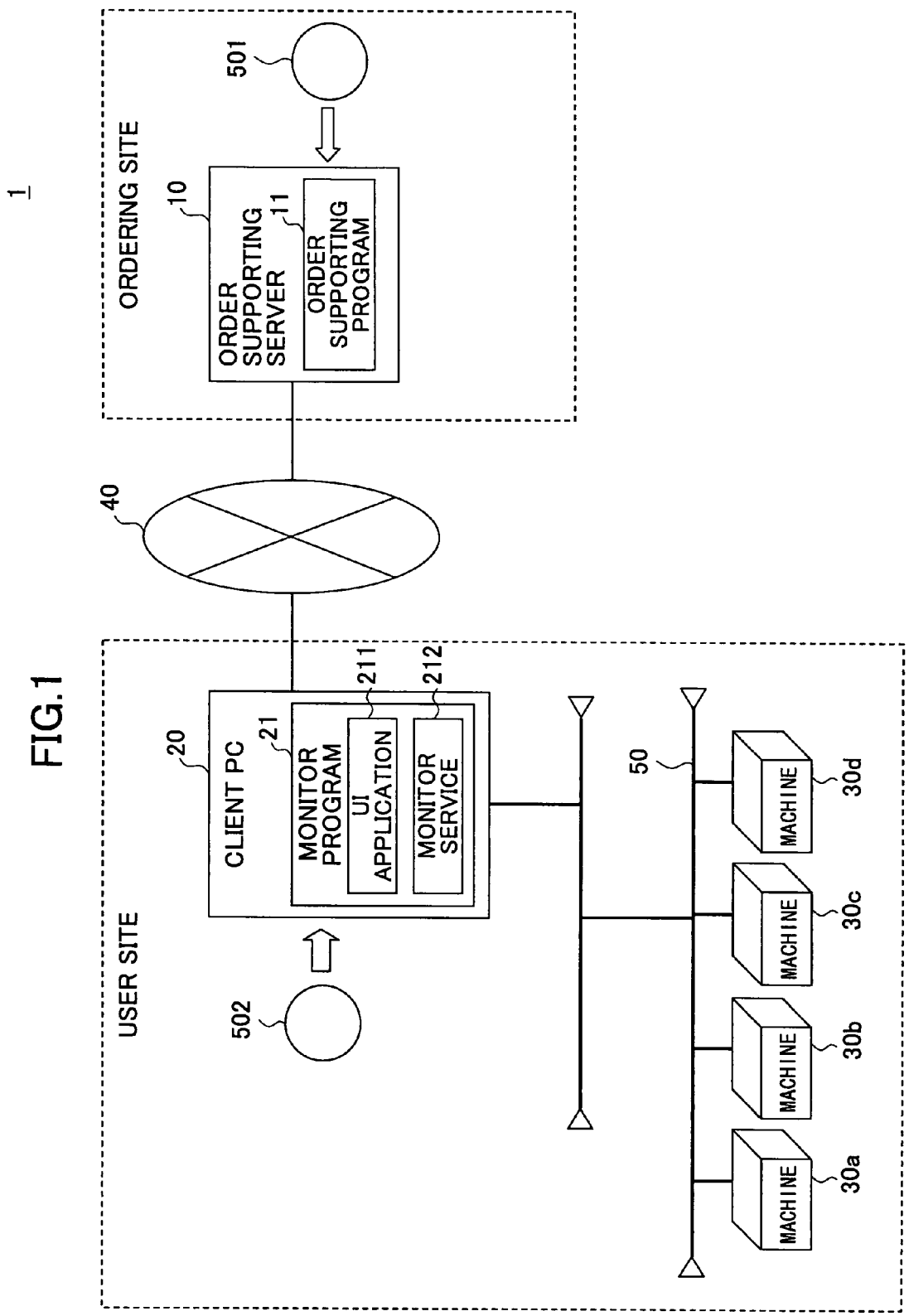
FIG. 1 is a schematic diagram showing an exemplary configuration of an order supporting system according to an embodiment of the present invention.

FIG. 1 is an exemplary configuration of an order supporting system according to an embodiment of the present invention. In FIG. 1, the order supporting system 1 includes, for example, an order supporting server 10, a client PC 20, and plural machines 30a, 30b, 30c, 30d (hereinafter also generically referred to as "machine 30"). The order supporting server 10 is located at an ordering site (i.e. the side of the supplier providing the consumable supplies of the machine 30 (supplier side)). The client PC 20 and the machine 30 are located at a user site (the side of the user of the machine 30 (user side) such as an office). The order supplying server 10 and the client PC 20 are connected via a wide area network such as the Internet. Furthermore, the client PC 20 and the machine 30 are connected via a network (including both cable and wireless network) such as a LAN (Local Area Network) connected to the user site.

The machine 30 may be for forming images (image forming apparatus), such as a typical printer or a multi-function machine which consumes various supplies such as toner and ink. In this example, the machine 30 corresponds to an MIB (Management Information Base). The machine 30 can respond to requests for obtaining MIB data received via a network according to SNMP (Simple Network Management Protocol). Furthermore, the machine 30 can detect status data of consumable supplies. The status data may be qualitative data (normal, near-end, end) or quantitative data (100%, 90%, . . . , 10%, 0%).

The client PC 20 may be a general purpose computer having a monitor program 21 installed therein. The monitor program 21 may be installed from a recording medium 502 (e.g., CD-ROM) or downloaded from a network. In the below-described embodiment of the present invention, the monitor program 21 is downloaded from a network 40.

The monitor program 21 includes a UI application 211 and a monitor service 212. The UI application 211 is activated as a process separate from the monitor service 212. The UI application 211 provides a GUI (Graphical User Interface) for indicating functions of the monitor service 212. For example, the UI application 211 provides a screen for setting set-up data of the monitor service 212 or a screen for displaying machine data obtained by the monitor service 212.

Figure 2:
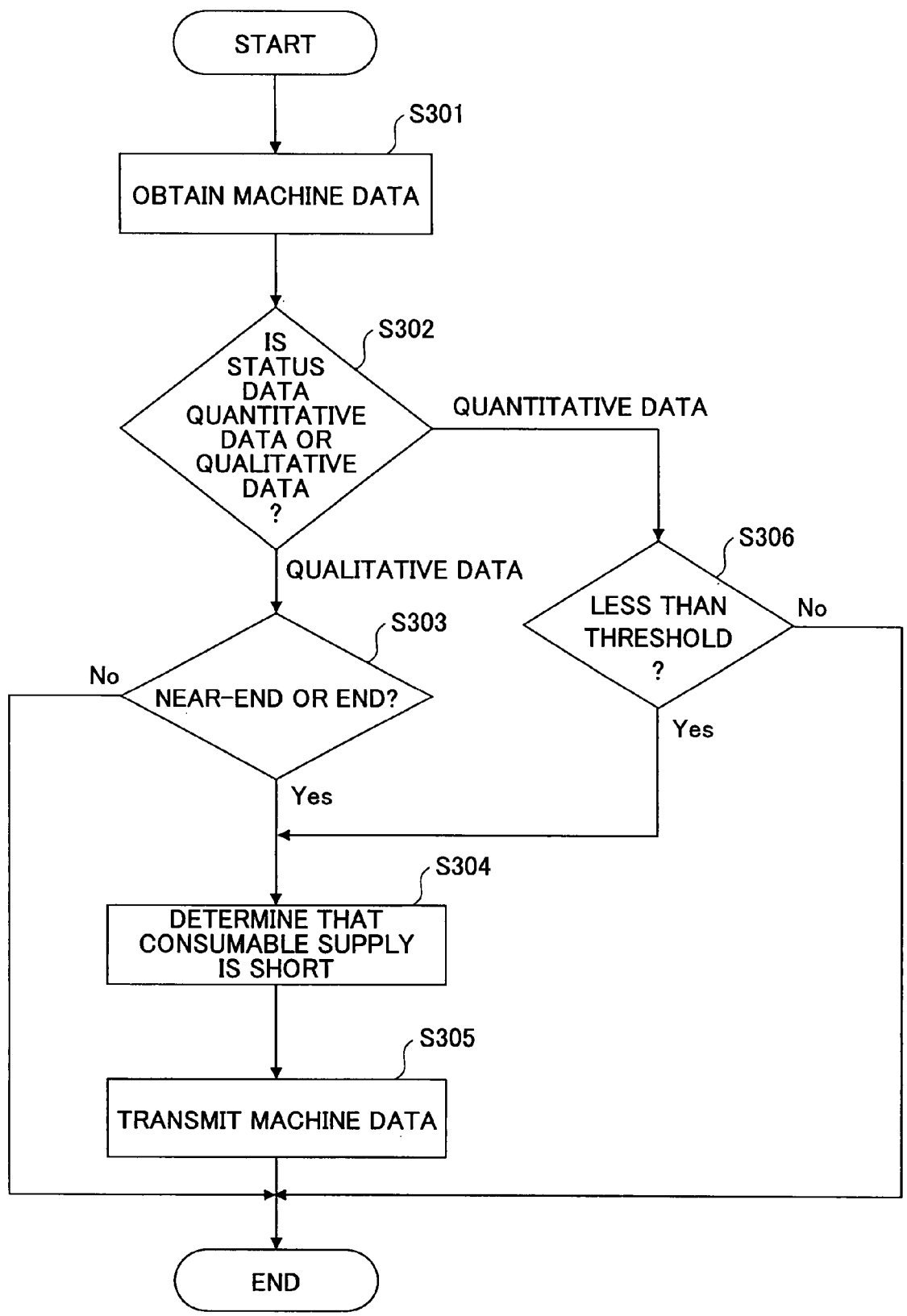
FIG. 2 is a flowchart for describing functions of a client PC caused by a monitor service according to an embodiment of the present invention.

The monitor service 212 is a program activated as a daemon process. By loading the monitor service 212 in the memory of the client PC 20 and processing the program with the CPU, the client PC 20 performs the below-described functions. FIG. 2 is a flowchart for describing overall functions performed by the client PC 20 in accordance with the monitor service 212 according to an embodiment of the present invention.

In FIG. 2, the client PC 20 periodically obtains machine data (MIB data) from each machine 30 (S301). The machine data include data for identifying the status of the consumable supply(ies) used by the machine 30 (status data). For example, the status data may include toner status or total counter value (total number times of printing paper). The status data may also include data indicating the status of other consumable supplies such as a fixing unit, a disposal toner bottle, a photoconductor, or a developer. In a case where status data of a consumable supply included in the obtained machine data are qualitative data ("qualitative data" in S302, i.e. data indicative of normal/near-end/end), it is determined that the consumable supply is short (S304) when the qualitative data are near-end data or end data (hereinafter also generically referred to "end data") (Yes in S303). Then, the machine data of the machine 30 are transmitted to the order supporting server 10 (S305). Meanwhile, in a case where status data of a consumable supply included in the obtained machine data are quantitative data ("quantitative data" in S302, i.e. data indicative of 100%, 90%, . . . , 10%, 0%), it is determined whether the quantity of the consumable supply is below a predetermined threshold (no greater than 30%) (S306). It is determined that the consumable supply is short (S304) when the quantitative data is below the predetermined threshold (Yes in S306). Then, the machine data of the machine 30 are transmitted to the order supporting server 10 (S305).

Although the above flowchart describes a case where the monitor apparatus 20 detects whether there is a shortage of consumable supplies, the detection may be performed by the order supporting server 10. In such a case, the monitor apparatus 20 is to transmit machine data of all of the machines 30. Therefore, from the aspect of reducing the traffic load of the network, it is preferable to transmit machine data of only those of machines from which shortage is detected by the monitor apparatus 20.

The client PC 20 may also have installed a mailer for transmitting and receiving electronic mail or a Web browser for browsing Web pages.

The order supporting server 10 may be a general purpose computer including a function of a Web server and an order supporting program 11 installed therein. The order supporting program 11 may be installed from a recording medium 501 (e.g., CD-ROM) or downloaded from a network.

By loading the order supporting program 11 in the memory of the order supporting server 10 and processing the program with the CPU, the order supporting server 10 performs the below-described functions. That is, an electronic mail generating part of the order supporting server 10 generates an electronic mail for instructing re-supply of a short consumable supply based on machine data received from the client PC 20 and transmits the electronic mail to a pre-registered mail address of the user. A URL for a Web page dedicated to ordering the short consumable supply (hereinafter referred to as "supply order page") is written in the transmitted electronic mail. In response to an HTTP request transmitted based on the clicking of the URL, the order supporting server 10 returns a supply order page. Then, the order supporting server 10 receives an order requesting the consumable supply (supply order request) based on the supply order page. The order supporting server 10, in response to the supply order request, transmits an instruction to order the consumable supply (supply order instruction) to a merchandise order management system (not shown).

Meanwhile, the inventor of the present invention proposes to establish a new business model using the order supporting system 1 according to an embodiment of the present invention. First, the background of how the inventor arrived at establishing such a business model is described below.

Generally, distribution of image forming apparatuses is carried out through various distribution channels (e.g., business agents). Agencies which purchase a product (image forming apparatus) from a manufacturer and directly sell the product to customers are hereinafter referred to as "distributors". The distributors not only include those who simply sell the image forming apparatus as hardware but may also include those who provide additional solutions according to the customer's needs and perform system integration (SI) services for enabling the image forming apparatus to function according to such solutions. The main sources of profit for the distributors are profit gained from selling image forming apparatuses as hardware and also software based on system integration (SI) services.

On the other hand, image forming apparatuses also have a characteristic of being able to continuously generate profit by the distributor continuously selling consumable supplies even after the image forming apparatus is sold. In general, such profit tends to be greater than the profit obtained by selling the image forming apparatus. However, after purchasing the image forming apparatus, the customer (user) generally purchases consumable supplies from, for example, mass retailers or through mail-order shopping rather than purchasing from the distributors. Therefore, the distributors having sold the image forming apparatus is unable to obtain continuous profit by selling consumable supplies of the image forming apparatus.

Next, an example supposing that a distributor sells image forming apparatuses of manufacturer A and manufacturer B is described. Supposing that the profit obtained by selling a consumable supply of the image forming apparatus of manufacturer A is refunded to the distributor having sold the image forming apparatus of manufacturer A, there would be an incentive that the distributor desires to sell more image forming apparatuses of manufacturer A than those of manufacturer B. As a result, increased sales of the product of manufacturer A are anticipated. Thus, the manufacturer A can attain an advantageous position with respect to manufacturer B.

Accordingly, the inventor of the present invention proposes a new business model, in which profit obtained by selling consumable supplies is refunded to the distributor. An example of applying the order supporting system 1 to the business model is described below.

First, procedures (processes) executed in an operation by the order supporting system 1 shown in FIG. 1 are described. The user having purchased a machine 30 from the distributor concludes a registration contract with the distributor. As described in detail below, it is anticipated that the user can reduce the cost for re-supplying short consumable supplies by using the order supporting system 1. For the user, such anticipation serves as an incentive for concluding a registration contract.

FIG. 3 is a sequence diagram for describing procedures executed upon user registration with the order supporting system 1 according to an embodiment of the present invention. In FIG. 3, the Web browser 22 is a general purpose Web browser installed in the client PC 20. Furthermore, the mailer 23 is a general purpose mailer installed in the client PC 20.

First, the user obtains an ID used for accessing the order supporting server 10 (hereinafter referred to as "access ID") during registration of the contract and a URL of the order supporting server 10 from a distributor. Then, the user inputs the URL to the Web browser 22. In response to the input of the URL, input of the access ID is requested of the user. If an appropriate access ID is input, a Web page used for user registration (hereinafter referred to as "user registration page") is transmitted from the order supporting server 10 to the Web browser 22 (S11). The Web browser 22 receiving the user registration page from the order supporting server 10 displays the received user registration page.

FIG. 4 is a schematic diagram showing an example of the user registration page being displayed. In the below description of FIG. 4, the numerals indicated in the parenthesis correspond to the reference numerals shown in FIG. 4. As shown in FIG. 4, basic data such as the name (221), the postal code (222), the address (223), the company name (224), the department name (225), the telephone number (226), the facsimile number (237), and the e-mail address (228) of the user can be input in the user registration page 220. Furthermore, destination data (231) regarding the destination to which the consumable supply is to be delivered (e.g., postal code, address, company name, and department name of delivery destination) and distributor ID (232) can also be input to the user registration page 220. In this example, the distributor ID is an ID of the distributor serving as the associate of the registration contract concluded by the user. The distributor ID is reported to the distributor upon registration of the contract.

The user inputs necessary items in the user registration page 220. Then, when the user clicks a register button 233, the Web browser 22 transmits an HTTP request to the order supporting server 10 for requesting user registration (S12). The HTTP request includes data input to the user registration page 220 (hereinafter referred to as "user data" including the distributor ID).

When the order supporting server 10 receives the HTTP request, the order supporting program 11 of the order supporting server 10 registers the user data included in the HTTP request in a predetermined database (hereinafter referred to as "user database") (S13). In registering the user data, the order supporting program 11 determines whether the distributor ID included in the user data is input (stored) in the order supporting server 10. In a case where there is an entry corresponding to the distributor ID, the order supporting program 11 generates or assigns a user ID and a password corresponding to the user. Thus, the order supporting program 11 registers the user data including the user ID and the password in the user database.

Then, the order supporting program 11 transmits an electronic mail having predetermined data written in its main text (hereinafter referred to as "install data report mail") to the mail address of the user (S14). The predetermined data in the electronic mail include, for example, the URL of a Web page for enabling downloading by the monitor program 21 (hereinafter referred to as "download page") and the user ID and the password generated by the order supporting program 11. Furthermore, the order supporting program 11 includes a Web page used for displaying a message indicating that the install data report has been transmitted inside the HTTP response corresponding to the HTTP request of Step S12 and transmits the HTTP response to the Web browser 22. Through the transmitted Web page, the user can acknowledge that the install data report mail has been transmitted to the user. By using the mail 23, the user can browse the install data report mail and confirm various data such as the URL of the download page and the user ID and password assigned to the user.

It is to be noted that the reporting of the data (e.g., URL of the download page) is not limited to a method of transmitting electronic mail. For example, as an alternative to transmitting a Web page indicating a message reporting the transmission of the install data report mail, the download page may be transmitted to the user in Step S14. However, in such case where the download page is transmitted in Step S14, it becomes necessary to successively proceed to an installing process. On the other hand, in the case of transmitting the install data report mail, the installing process can be conducted at a convenient time for the user once the install data report data are received. Furthermore, such data may also be transmitted by facsimile or postal mail.

When the user clicks the URL of the download page indicated in the install data report mail, the mailer 23 activates the Web browser 22 using the URL as an argument. When the Web browser 22 is activated, the Web browser 22 displays the download page based on the URL. When the user clicks a URL of a download destination displayed in the download page, the Web browser 22 transmits a request for downloading the monitor program 21 (download request) to the order supporting server 10 (S15). In response to the download request, the order supporting program 11 transfers an installment package of the monitor program 21 stored in the order supporting server 10 to the client PC 20 (S16).

The user activates an installer 25 included in the installment package downloaded from the order supporting server 10 (S17). When the installer 25 is activated, the installer 25 requests the user to input predetermined data such as the user ID and the password indicated in the install data report mail. When the user inputs the predetermined data including the user ID and password, the installer 25 transmits the input user ID and the password to the order supporting server 10 and requests the order supporting server 10 to authenticate the user (S18). It is to be noted that the input user ID and password are also stored and managed in the client PC 20.

The order support program 11 performs authentication of the user by comparing the user ID and the password transmitted from the installer 25 with the user ID and the password registered in the user database (S19). The order supporting program 11 transmits the authentication result to the monitor program 21 (S20). The installer 25 installs the monitor program 21 (S21) only when the authentication succeeds (S21). The installer 25 cancels the installing process when the authentication fails.

Since the installing process is conducted only when the user is successfully authenticated, the install package can be prevented from being installed by a user illicitly obtaining the install package. The monitor program 21 is for communicating with the order supporting program 11 via a network. Thus, from the aspect of preventing an unauthorized user from attacking the order supporting server 10 via the network, it is effective to perform user authentication prior to installment for preventing an unauthorized user from using the monitor program 21.

After the installing process is completed, a monitor service 212 of the monitor program 21 is initiated in the client PC 20. First, the monitor service 212 searches for machines 30 connected to a network 50 (S22). Then, the monitor service 212 transmits data of all of the machines 30 found in the search (data such as a serial number, a MAC address, a model (type) name, and a vendor name (name of manufacturer of machine), hereinafter referred to as "searched machine data") to the order supporting server 10 (S23). It is to be noted that known methodologies may be used for searching for the machines 30 and obtaining searched machine data through the network 50.

The order supporting program 11 registers the searched machine data transmitted from the monitor service 212 into a predetermined database (hereinafter referred to as "machine database") (S24).

FIG. 5 is an exemplary configuration of a machine data table included in the machine database. The machine data table 12 shown in FIG. 5 is for registering and managing a MAC address, a vendor name, a model name, a serial number, a monitor flag, a comment, a supply status, and a mail flag in correspondence with each machine 30 found in the search. The MAC address, the vendor name, the model name, and the serial number are registered as they are according to corresponding data in the searched machine data. In addition, although other data such as an IP address are registered, such data are not shown in FIG. 5 for the sake of convenience.

The monitor flag is flag data indicating whether the machine 30 is a target for monitoring by the monitor service 212. In a case where the machine 30 is a monitor target, the monitor flag of the machine 30 is registered as "Yes". In a case where the machine 30 is not a monitor target, the monitor flag of the machine 30 is registered as "No". It is to be noted that the monitor flag is initially registered as "Yes". Alternatively, the initial value of the monitor flag may be "Null" (blank). The item "comment" in the table is for arbitrarily registering data desired to be associated to the machine 30 by the user.

The item "supply status" is for registering data identifying the status of a given consumable supply. In this example, the letters "N (Normal)", Ne (Near-End)", and "E (End)" are registered in the item "supply status". The initial value of the item "supply status" may be "N". Alternatively, the initial value of the supply status may be "Null" (blank)". The item "mail flag" is described in detail below.

Next, the order supporting program 11 transmits a URL of a Web page used for displaying a list of the searched machine data (hereinafter referred to as "machine search table page") to the monitor service 212 (S25). The monitor service 212 activates the Web browser 22 using the URL transmitted from the order supporting program 11 as an argument (S26). When the Web browser 22 is activated, the Web browser 22 transmits an HTTP request for requesting the machine search table page to the order supporting server 10 based on the URL designated by the argument (S27). In response to the HTTP request transmitted from the Web browser 22, the order supporting program 11 generates a searched machine data list page based on the data registered in the machine data table 12 and transmits the generated searched machine data list page to the Web browser 22 (S28).

FIG. 6 is an example of a searched machine data list page. In the below description of FIG. 6, the numerals indicated in the parenthesis correspond to the reference numerals shown in FIG. 6. As shown in FIG. 6, data such as a serial number, a MAC address, an IP address, a model name, and a vendor name corresponding to each machine 30 found (retrieved) in the search are displayed in the searched machine data list page 240. Furthermore, the searched machine data list page 240 also includes a comment column (241) for inputting a comment and a check-box column (242) for enabling the user to choose whether the machine 30 is a monitor target for monitoring by the monitor service 212 (monitoring necessity). That is, the user inputs a comment and selects a monitor target for each machine 30 by using the searched machine data list page 240. In this example, a check-marked check box signifies that a corresponding machine 30 is selected as a monitor target. Although the user can arbitrarily input data in the comment column 241, it is preferable to input data for accommodating the operation of exchanging the consumable supplies (e.g., location of the machine 30).

After the user completes inputting of comments and selection of the monitor target for each machine 30 in the searched machine data list page 240, the user clicks a transmit button 243. When the user clicks the transmit button 243, the Web browser 22 transmits a HTTP request to the order supporting server 10 for requesting the order supporting server 10 to register a corresponding comment and a monitoring necessity for each machine 30 (S29). Based on the HTTP request transmitted from the Web browser 22, the order supporting program 11 additionally registers the corresponding comment and the monitoring necessity for each machine 30 in the machine data table 12 (S30). That is, the order supporting program 11 registers "Yes" in the monitor flag of the machine data table 12 for a machine 30 selected as a monitor target and registers "No" in the monitor flag of the machine data table 12 for a machine 30 not selected as a monitor target.

FIG. 7 is an example of the machine data table having a monitoring necessity and a comment registered therein. In the machine data table 12 shown in FIG. 7, a comment indicating location data "Oomori 4F" is registered in an entry of the first row. Furthermore, the machines 30 indicated in the entries of the first to fourth rows are registered as monitor targets and the machines 30 indicated in the entries of the fifth and seventh rows are excluded from being monitor targets.

Thereby, the procedures executed upon user registration are completed. It is to be noted that the monitor program 21 may also add a monitor target in a process other than the installing process. For example, the monitor program 21 may register searched machine data and display the searched machine data list page for allowing the user to select a monitor target from a menu.

The monitor service 212 automatically repeats (for example, periodically) the process of searching for machines 30 connected to the network 50 after the selection of the monitor targets (S31). Then, the monitor service 212 transmits the searched machine data of corresponding machines found by the search (S32). The order supporting program 11 updates the machine data table 12 based on the transmitted from the monitor service 212 (S33). By periodically inspecting the configuration of the network 50 by searching through the machines 30 and updating the machine data table 12 based on the inspection results, the possibility of inconsistency occurring between the content of the machine data table 12 and the configuration of the network 50 can be reduced.

Figure 8:
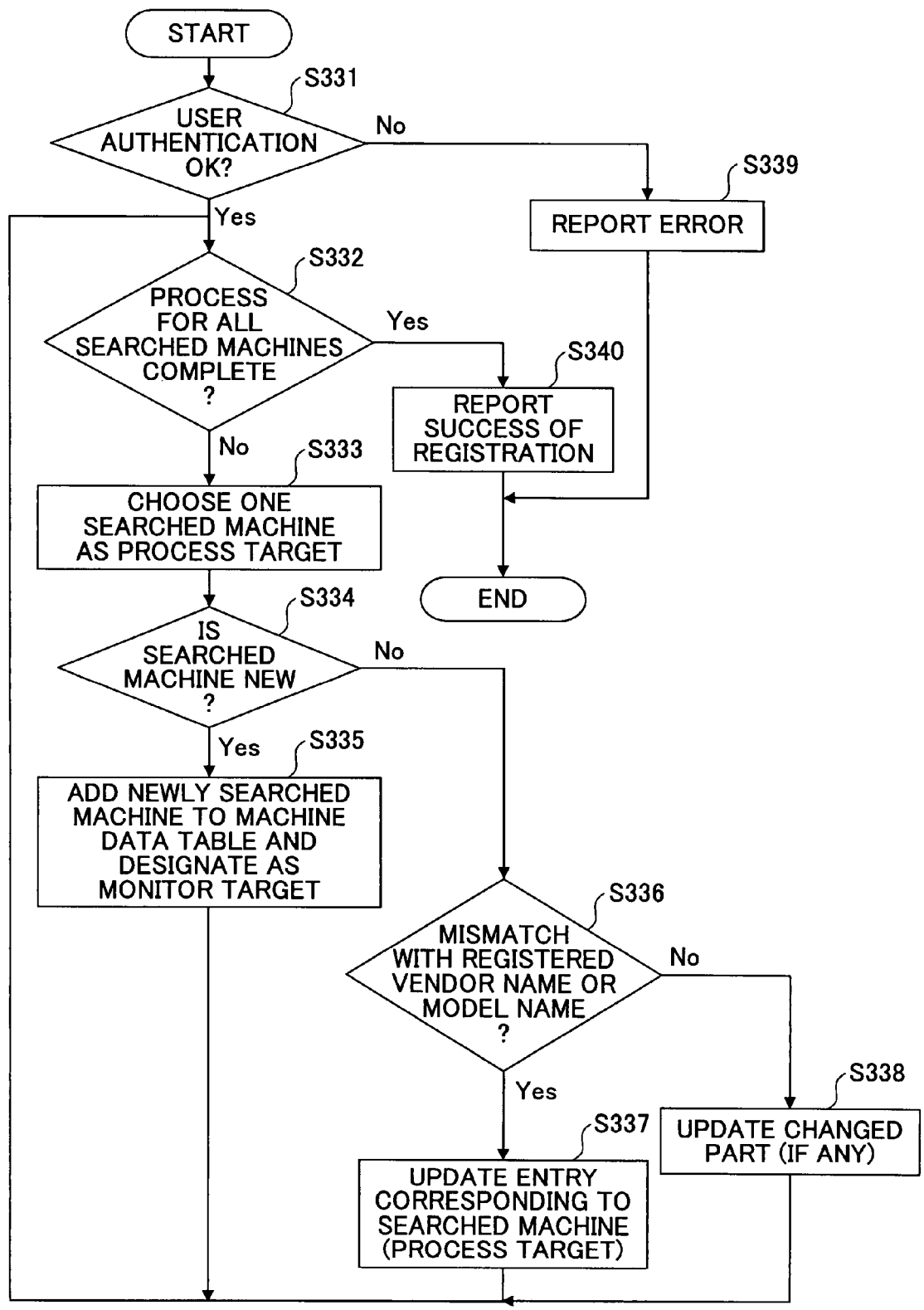
FIG. 8 is a flowchart for describing an update process performed on a machine data table by an order supporting program according to an embodiment of the present invention.

Next, a process of updating the machine data table in Step S33 is described in detail. FIG. 8 is a flowchart for describing an update process performed on a machine data table by the order supporting program 11 according to an embodiment of the present invention. When the order supporting program 11 receives searched machine data, the order supporting program 11 performs user authentication based on the searched machine data and the user ID and the password transmitted from the monitor service 212 (S331). In a case where the user is successfully authenticated (Yes in S331), the below-described steps S332 through S338 are conducted for each machine included in the searched machine data.

First, one of the machines 30 is chosen as the target for processing (hereinafter referred to as "current machine") (S333). Then, it is determined whether the current machine is a machine that is newly found by the searching process (hereinafter referred to as "new machine") (S334). The MAC address of the current machine is used as a key in performing this determination. That is, it is determined whether an entry having the MAC address is included in the machine data table 12. If there is no such entry, it is determined that the current machine is a new machine.

In a case where the current machine is determined as a new machine (Yes in S334), the entry corresponding to the current machine is registered in the machine data table 12 (S335). Upon this registration, the current machine is designated as a monitor target. That is, the monitor flag corresponding to the newly registered entry is registered as "Yes". In a case where the searching process is performed automatically, there is no suitable timing for querying the user on whether the new machine is to be chosen as a monitor target. Therefore, the monitor flag corresponding to the new machine is automatically registered as "Yes" by the order supporting program 11. Initially, the monitor program 21 is installed for the purpose of monitoring the consumable supplies of machines 30 connected to the network 50. Thus, considering the needs of the user, it is preferable that the new machine be initially designated as a monitor target (default monitor target). For this reason, the monitor flag corresponding to the new machine is registered as "Yes" rather than "No". Furthermore, from the aspect of the ordering site, it is preferable to designate as many machines possible as monitor targets for promoting sales of consumable supplies.

On the other hand, in a case where an entry having the MAC address of the current machine is already included in the machine data table 12 (No in S334), it is determined whether the vendor name and the model name of the existing entry match those of the current machine (S336). This determination is conducted considering that the identity of a machine cannot be guaranteed merely by a match of the MAC address. In other words, since there may be a type of machine that obtains a MAC address from a network card, it is possible that the network card has been switched for use by another machine. Therefore, identification of machines performed by only relying on the MAC address of a machine may be insufficient.

In a case where at least one of the vendor name and the model name of the current machine does not match that of the existing entry having a MAC address matching the MAC address of the current machine (No in S334), the mismatching part of the existing entry is updated and the monitor flag of the entry is registered as "Yes". FIG. 9 shows an example of updating the machine data table 12 in a case where there is an entry having a mismatching model name.

More specifically, FIG. 9 shows an exemplary case of updating the machine data table 12 where there is an entry having a mismatching model name (fifth row of the machine data table 12 in FIG. 9). That is, the model name of the entry listed in the fifth row of the machine data table 12 is changed to a model name included in the searched machine data of the current machine, and the monitor flag of the entry listed in the fifth row of the machine data table 12 is registered as "Yes". The monitor flag of the entry listed in the fifth row is registered as "Yes" since it is suitable to handle such a machine as a new machine.

Meanwhile, in a case where both the vendor name and the model name of the current machine match those of the existing entry having a MAC address matching the MAC address of the current machine (No in S334 and S336), the current machine is determined as a machine corresponding to an entry that already exists (registered) in the machine data table 12. However, if there is a change in a part(s) of the attributes (e.g., serial number) of the existing entry, the item corresponding to the changed attribute is updated (S338). In this case, however, the monitor flag of the existing entry is not changed. That is, in a case where the monitor flag of the existing entry is registered as "No", the monitor flag remains unchanged. The monitor flag registered as "No" is not automatically changed (i.e. remains unchanged) since changing the monitor flag would contradict the intention of the user having removed the machine from a monitor target.

When the Steps 333 through S338 are completed for all of the machines included in the searched machine data (Yes in S332), the order supporting server 10 transmits a message to the monitor service 212 for reporting that registration of searched machine data has succeeded (S340). Once the message is transmitted, the operation of the order supporting program is completed. It is to be noted that, in a case where the user authentication fails (No in S331), the order supporting server 10 transmits an error message to the monitor service 212 without performing the updating process on the machine data table 12 (S339).

Figure 10:
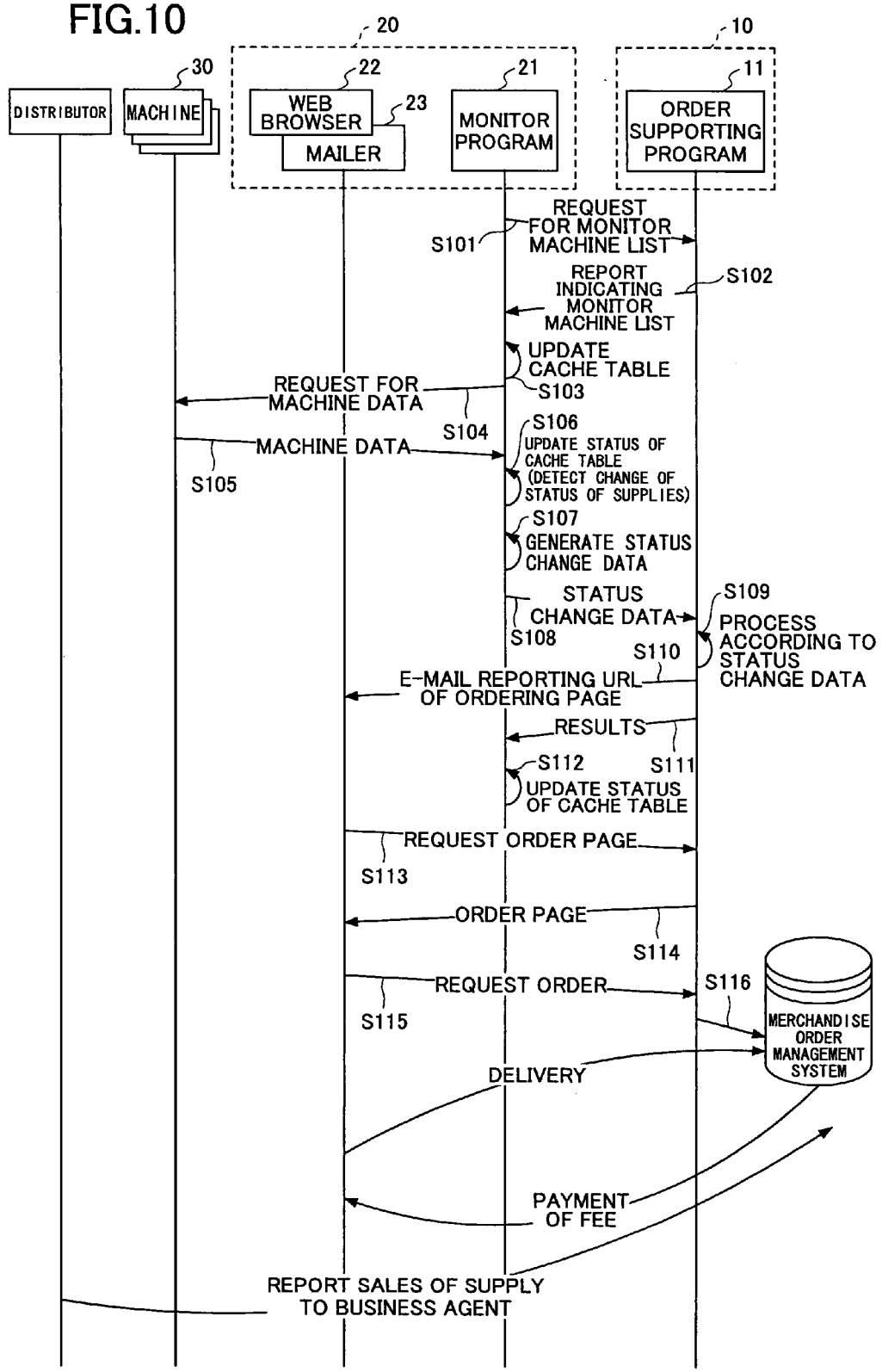
FIG. 10 is a sequence diagram for describing procedures executed upon conducting a machine monitoring operation with an order supporting system according to an embodiment of the present invention.

Next, procedures executed in the order supporting system 1 during the monitoring of statuses of machines 30 with a monitor program 21 (monitor service 21) installed in the client PC 20 are described. FIG. 10 is a sequence diagram for describing procedures executed upon conducting a machine monitoring operation with the order supporting system 1 according to an embodiment of the present invention.

At repetitive (e.g., periodically) machine status monitoring intervals, the monitor service 212 requests the order supporting server 10 for a list indicating one or more machines 30 designated as a monitor target (hereinafter referred to as "monitor machine") (S101). The order supporting program 11 of the order supporting server 10 prepares the list by listing the monitor machines based on the monitor flags of the machine data table 12 and transmits the list of monitor machines (monitor device list) to the monitor service 212 (S102). It is to be noted that the monitor service 212 may conduct a machine monitoring operation at timings other than the above-described machine status monitoring interval. For example, the monitor service 212 may conduct a machine monitoring operation in correspondence with a user's selection from a menu.

Accordingly, the order supporting service itself 212 does not distinguish which machines 30 are to be managed as monitor targets. Instead, the order supporting service 212 distinguishes the monitor machines by querying the order supporting server 10. With such a configuration, the monitor service 212 can be easily implemented and workload can be reduced.

When the monitor service 212 receives the monitor machine list, the monitor service 212 updates a cache table based on the received monitor machine list (S103). The cache table is for enabling the monitor service 212 to manage, for example, the status of the supplies of the monitor machines. The cache table may be provided in the memory of the client PC 20.

FIG. 11 is an exemplary configuration of a cache table. As shown in FIG. 11, the cache table 27 is for registering and storing data such as MAC addresses, vendor names, model names, serial numbers, comments, monitor status, supply status, and notice flags in correspondence with each monitor machine. In the above-described Step S103, the monitor service 212 registers or updates MAC addresses, vendor names, model names, serial numbers, and comments based on the received monitor machine list. For example, in a case where the cache table 27 has no entry corresponding to a MAC address that matches the MAC address of a monitor machine listed in the received monitor machine list, the monitor service 212 newly adds an entry of the monitor machine in the cache table 27. In a case where there is an entry corresponding to a MAC address matching the MAC address of a monitor machine listed in the received monitor machine list but partly has different data items (different vendor name, model name, serial number, or comments), the entry having the partly different data items is updated. Furthermore, in a case where the cache table 27 includes an entry having a MAC address that is not included in the monitor machine list, the monitor service 212 deletes the entry from the cache table 27. In other words, the cache table 27 is for storing (maintaining) entries corresponding to machines that are designated as monitor machines at that current time. It is to be noted that "monitor status", "supply status", and "notice flag" are items of the cache table 27 which are to be updated in a below-described process.

Then, the monitor service 212 requests for machine data (i.e. MIB data) to the machines 30 (monitor machines) corresponding to the entries of the cache table 27 by using SNMP (S104). In this example, the MIB data include at least status data of toner. The MIB data may also include status data of other supplies (consumable supplies). Then, in response to the request from the monitor service 212, each machine returns MIB data to the monitor service 212 (S105).

Although the machine data according to the above-described embodiment of the present invention are described as MIB data, the machine data are not limited to MIB data. Furthermore, the protocol used for requesting the machine data is not limited to SNMP. It is, however, preferable to use standardized technologies such as MIB and SNMP so that machine data can be obtained with the same procedures even in a case where the vendor of each machine 30 is different.

After the obtaining (polling) of machine data from all of the monitor machines is completed, the monitor service 212 updates the items "monitor status", "supply status", and "report flag" in the cache table 27 in accordance with the obtained machine data (S106). With respect to the item "monitor status", the monitor service 212 registers "OK" to an entry corresponding to a machine from which machine data is obtained (success), and registers "NG" to an entry corresponding to a machine from which machine data could not be obtained (failure). Furthermore, status data of a supply (e.g., toner status data included in the obtained machine data) are registered in the item "supply status". Furthermore, "unreported" is registered in the item "report flag" in a case where there is a change in the supply status (supply status value). In other words, the monitor service 212 detects the change of the status of the supply by comparing the status data of the supply registered in the cache table 27 prior to the update process and the status data of the corresponding supply in the obtained machine data. Accordingly, in a case where the monitor service 212 detects a change in the status data of a supply, the monitor service 212 registers "unreported" in the notice flag of the entry corresponding to the machine having a change detected in its supply data. It is to be noted that the report flag is used for determining whether the change in the status of the supply is already reported to the order supporting program 11.

FIG. 12 is an example of updating the cache table 27 based on the results of polling for machine data. More specifically, FIG. 12 shows an exemplary case where the cache table 27 is updated from the state shown in FIG. 11. That is, in the entry in the first row of the cache table 27, the supply status changes from "normal (no shortage state)" to "near-end (near shortage state)". Accordingly, the value of the report flag is updated to "unreported". Likewise, since the supply status of the entry in the fourth row of the cache table 27 changes from "near-end" to "end (shortage state)", the value of the report flag is updated to "unreported". Meanwhile, in the entries of the third and fifth rows, the values of the report flags remain unchanged since there is no change of supply status. Furthermore, in the entry of the second row, the monitor status is registered as "NG". This indicates that machine data of the machine corresponding to the entry could not be obtained (failure). In this case, the supply status and the value of the report flag corresponding to the entry of the second row are not updated.

Then, the monitor service 212 generates data for reporting change of status (status change data) based on the updated cache table 27 (S107). Accordingly, the monitor service 212 generates status change data for machines corresponding to entries that have their report flag value registered as "unreported". Therefore, in the cache table 27 shown in FIG. 12, status change data for the machines corresponding to the entries of the first, third, and fourth rows are generated.

FIG. 13 is a schematic diagram showing an exemplary configuration of status change data. As shown in FIG. 13, the status change data include header data and machine data.

The header data include items such as "date & time", "user ID", and "password". The item "date & time" indicates the date and time of transferring machine data. The items "user ID" and "password" are input and stored upon installing of the monitor program 21. That is, header data are not data obtained from the machines 30.

The machine data represent the same meaning as the above described machine data. That is, the machine data are data obtained as MIB data from each machine 30. The machine data include, for example, vendor name, model name (type name), serial number, MAC address, IP address, toner ID (data for identifying a toner bottle), toner name, toner status, toner level, toner name (localized as a character string), toner name (localized as code), and total counter value for each machine 30. It is to be noted that plural toner IDs are assigned one for each color in a case of outputting a color image, and a single toner ID is assigned in a case of outputting a monochrome image. These items of machine data are defined as public MIB (standard MIB) which are data that can be obtained from any machine regardless of the vendor.

The toner status is for indicating the status of toner. The total counter value is for indicating the total number of copies printed. Accordingly, the monitor service 212 detects the end of toner based on the toner status. Furthermore, the monitor service 212 determines wear or consumption of, for example, the photoconductor, the fixing unit, and the developer based on the total counter value. However, with the toner status of the standard MIB, the color of the toner being in a shortage state (end state) cannot be identified.

Therefore, the machine data according to an embodiment of the present invention also include, for example, a monochrome counter value, a color counter value, a cyan counter value, a magenta counter value, a yellow counter value, a black counter value, and a red counter value. These items of machine data are defined as private MIB (extended MIB). The extended MIB are uniquely defined by the vendor.

For example, in a case where extended MIB data are applicable only for a machine 30 of manufacturer A, extended MIB data of the machine 30 of manufacturer A are input to the items corresponding to the extended MIB data. In a case of machines 30 of other manufacturers besides manufacturer A, no data are input to the items corresponding to the extended MIB data.

For example the monochrome counter value indicates the number of sheets printed by monochrome printing. The color counter value indicates the number of sheets printed by color printing. Furthermore, the cyan counter value, the magenta counter value, the yellow counter value, the black counter value, and the red counter value each indicates the number of sheets printing by toner of each color. Accordingly, with the machine 30 of manufacturer A, the shortage state (end state) of toner of each color can be detected.

It is to be noted that, although a single entry is assigned to each monitor machine such as in the cache table 27 shown in FIG. 12, an entry can be assigned to each supply in a case of managing statuses of plural supplies (e.g., toner status or total counter for CMYK). Furthermore, the data included in the status change data are not limited to those shown in FIG. 13. The status change data may be determined based on necessity.

Then, the monitor service 212 transmits the generated status change data to the order supporting program 11 (S108). It is to be noted that, it is preferable to transmit the status change data for each machine together at once (as a single message) from the aspect of reducing communication load. Compared to transmitting the status change data as separate messages, data of the overhead can be reduced.

The order supporting program 11 receiving the status change data performs various processes according to the status change data, such as updating the machine data table, or determining which machines have a shortage of supplies (S109). It is to be noted that the processes of Step S109 are described in detail below.

Then, the order supporting program 11 generates a Web page used for ordering supplies that are short (hereinafter referred to as "order page"). Then, the order supporting program 11 prepares an electronic mail for reporting the shortage of the supplies (hereinafter referred to as "shortage report mail") and transmits the shortage report mail to the mail address of the user (S110). The shortage report mail includes a URL of the order page. It is to be noted that an ID is assigned to each shortage report mail (hereinafter referred to as "mail ID"). Together with the mail ID, data such as machine identification data for identifying the machine 30 corresponding to the shortage report mail (e.g., serial number), user identification data for identifying the user (e.g., user ID or mail address) and transmission date/time are stored as transmission history of the shortage report mail.

Figure 14:
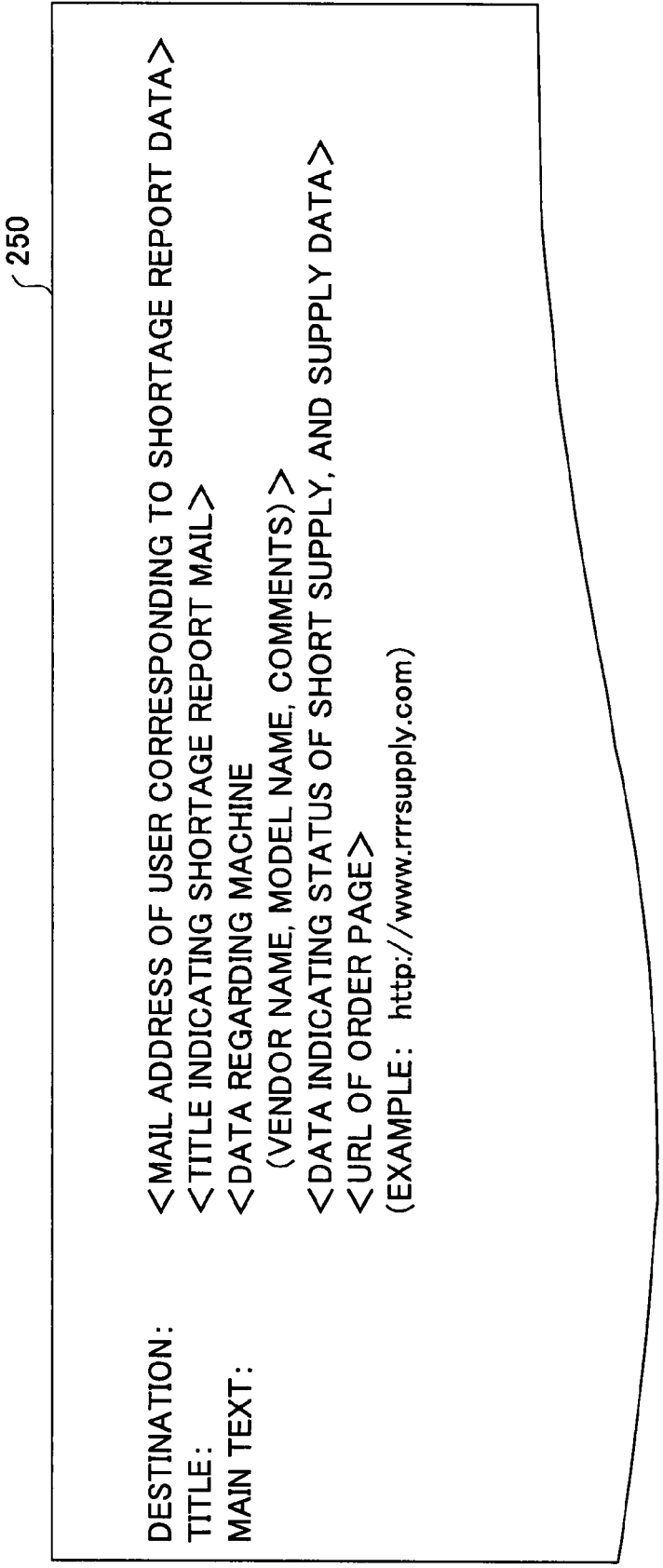
FIG. 14 is an example of a shortage report mail according to an embodiment of the present invention.

FIG. 14 is an example of the shortage report mail. In the shortage report mail 250 shown in FIG. 14, the character string enclosed by space < > are not actual numbers but are data indicating the content written in the space.

As shown in FIG. 14, a mail address of the user associated to the status change data is designated as the destination of the shortage report mail 250. In identifying the mail address of the user, the user database can be searched by using the user ID and password included in the status change data as a key since the mail address is registered together with a user ID and a password upon user registration.

A title indicating that the electronic mail is a shortage report mail is written as the title of the shortage report mail 250. The main text of the shortage report mail 250 includes, for example, machine related data corresponding to status change data, short supply related data, and the URL of the order page.

The machine related data include, for example, the vendor name, the model name, and comments corresponding to the machine. The machine related data can be obtained by searching the machine database by using, for example, the serial number, the MAC address, or the IP address included in the status change data as a key. Furthermore, the short supply data include, for example, toner status, toner ID, toner name included in the status change data in a case where the supply (consumable supply) is toner. In a case where plural supplies of a single machine 30 become short at substantially the same time, a single shortage report mail 250 including data corresponding to the plural supplies is prepared for reporting the shortage of the plural supplies.

After the order supporting program 11 transmits the shortage report mail 250 to the user, the order supporting program 11 transmits a report indicating the results of the various processes performed according to the received status change data (e.g., transmission of shortage report mail 250) to the monitor service 212 (S111). In a case where the processes performed by the order supporting program 11 are properly completed in accordance with the status change data (i.e. processing of status change data performed properly), the monitor service 212 updates the report flags of the cache table 27 from "unreported" to "reported" (S112).

FIG. 15 is an updated cache table 27 in a case where the status change data are properly processed. FIG. 15 shows an exemplary case where the cache table 27 is updated from the state shown in FIG. 12. In the cache table 27 shown in FIG. 15, the report flags of the entries of the first, third, and fourth rows are updated from "unreported" to "reported". By updating the values of the report flags in this manner, redundantly (doubly) transmitting the status change data corresponding to the supply of the properly processed status change data can be prevented. Accordingly, increasing the communication amount of data and redundantly transmitting shortage report mail 250 can be prevented.

Thus, the user can confirm the shortage report mail 250 with the mailer 23 of the client PC 20 so that the shortage of supplies can be recognized even in a case where a process (e.g., printing) is not being executed. Furthermore, by inputting, for example, the location of the machine 30 in the item "comments", the location of the machine can easily be identified based on the data registered in the item "comments".

When the user clicks the URL of the order page written in the shortage report mail 250, the mailer 23 activates the Web browser 22 using the URL as an argument. When the Web browser 22 is activated, the Web browser 22 transmits an HTTP request to the order supporting server 10 for requesting an order page based on the URL designated by the argument (S113). In response to the HTTP request, the order supporting program 11 returns an order page to the Web browser 22 (S114). The Web browser 22 displays the received order page.

FIG. 16 is an example of an order page 260 according to an embodiment of the present invention. In the order page 260 shown in FIG. 16, data regarding the machine 30 having a shortage of supplies (manufacturer name (vendor name), model name, serial number, comments (location)) are displayed in a space 261. Furthermore, a list of various supplies corresponding to the machine 30 is displayed in a space 262 for enabling an order to be made in correspondence with each supply. That is, the name (product name) of each supply is displayed for enabling the number of purchases to be input in correspondence with each supply. As shown in reference numeral 2621, with respect to the supply that is short, the supply is displayed in a manner having the necessary amount of the supply input beforehand. Furthermore, a link to a Web page displaying information of each product is attached to each product name. Furthermore, past purchase history of the user is displayed in the space 263. This prevents the user from doubly purchasing the short supply.

The purchase history is registered in the user database in correspondence with each user. That is, when a product is ordered through the order page 260, data of the ordered product are added (registered) to the user database.

In the order page 260 shown in FIG. 16, it is reported that the supply of yellow toner is short. As described above, the color of the short toner cannot be determined (identified) by only using standard MIB. Therefore, the order page 260 shown in FIG. 16 displays the results where data registered in the extended MIB are used for determination. Accordingly, with such order supporting system 1, the manufacturer defining its own extended MIB can differentiate its services from other manufacturers by using the extended MIB. In other words, even in a case where a shortage of a toner of another manufacturer's machine is detected, the order page 260 can only report shortage of toner and cannot identify the color that is short. Although it is possible to remove supplies of other manufacturers from the order targets of the order supporting system, the order supporting system in this example can order supplies of machines 30 of other manufacturers from the aspect of the convenience of the user.

When the user clicks the order button 2622 displayed on the order page 260, the Web browser 22 transmits an HTTP request to the order supporting server 10 for requesting ordering of the corresponding product (S115).

In response to the HTTP request, the order supporting program 11 records data used for granting part of the profit to the distributor associated with the user based on the requested order (S116). More specifically, a database is prepared for managing the sales of the supplies for each distributor based on the order supporting system 1 (hereinafter referred to as "distributor database") so that the content of the requested order (e.g., cost of the order) is recorded in the sales of the distributor database. It is to be noted that an entry corresponding to the distributor is generated in the distributor data by concluding a contract for participating in the order supporting system 1 between the distributor and the manufacturer. Furthermore, a distributor ID is assigned to the distributor so that the distributor can be identified in the order supporting system based on the distributor ID. It is to be noted that, in Step S116, identification of the user corresponding to the received HTTP request may be conducted, for example, by associating the session ID for the Web browser 22 and the user ID and identifying the user ID from a corresponding session ID based on the association.

The order supporting program 11 also sends an instruction to execute the requested order to a merchandise order management system. The instruction includes data regarding the delivery destination (recorded in the user database). By instructing the merchandise order management system to execute the order, the ordered merchandise is delivered to the actual user. When the fee of the merchandise is paid by the user, the sale corresponding to the requested order is finalized (defined) and recorded in the distributor database. By the finalization of the sale, the manufacturer may provide various benefits (e.g., sales promotion cash) to the distributor based on the sale.

Figure 17:
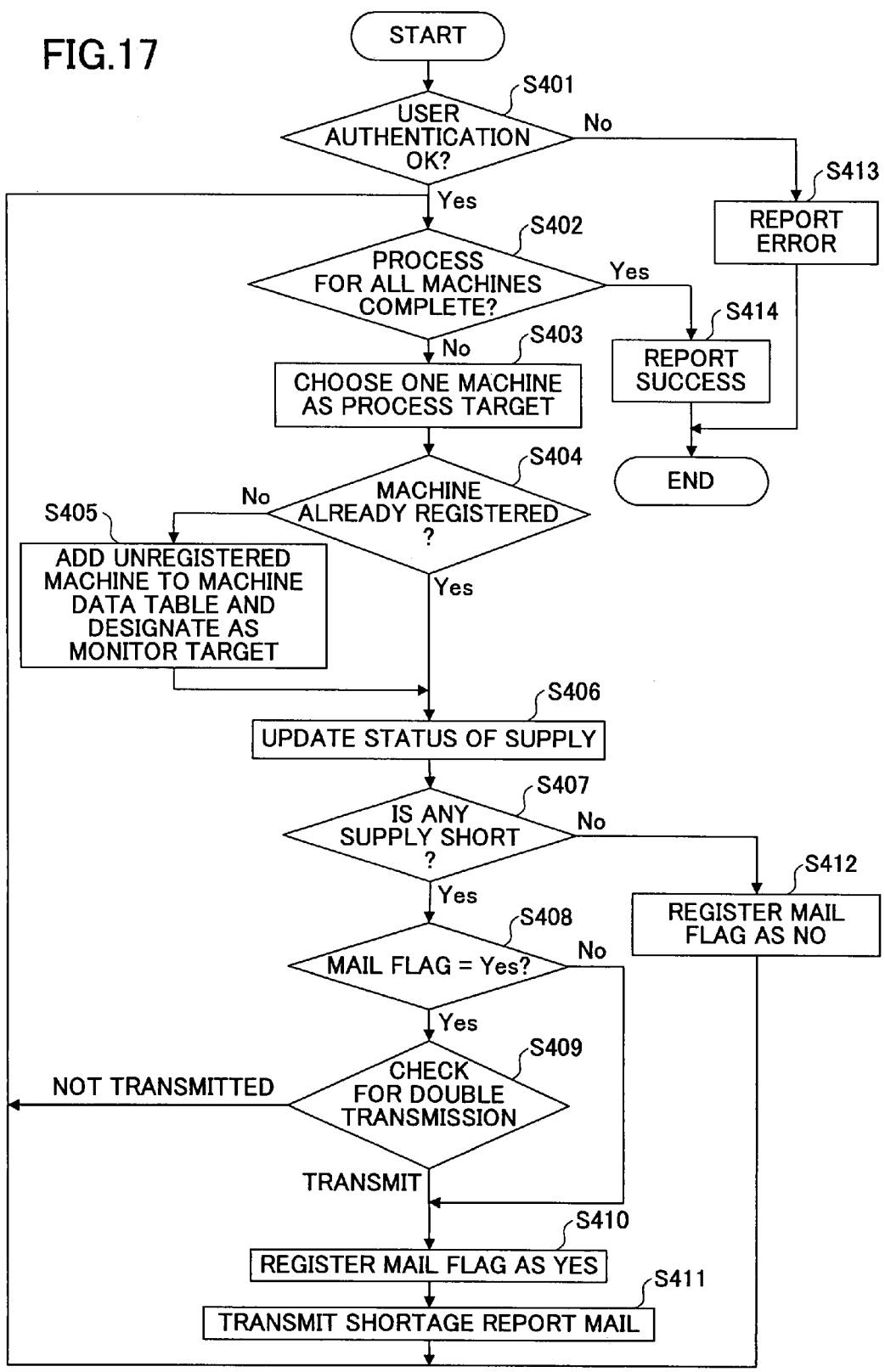
FIG. 17 is a flowchart for describing processes performed by an order supplying program based on status change data according to an embodiment of the present invention.

Next, the operation of Step S109 shown in FIG. 10 is described in further detail. FIG. 17 is a flowchart for describing the processes performed by the order supplying program 11 based on status change data.

When the order supporting program 11 receives status change data, the order supporting program 11 performs user authentication based on the received status change report data along with the user ID and password transmitted from the monitor service 212 (S401). In a case where user authentication is successful (Yes in S401), step S402 and the steps thereafter are performed on each machine corresponding to the received status change data.

First, a machine is chosen as a process target (hereinafter the machine chosen as the process target is referred to as "current machine") (S403). The order supporting program 11 determines whether the current machine is registered in the machine data table 12 (S404). In the determination, the MAC address of the current machine is used as a key for determining whether there is an entry having the same MAC address in the machine data table 12. In a case where the current machine is not registered (No in S404), an entry of the current machine is newly registered in the machine data table 12 (S405). In this step, the current machine is designated as a monitor target. It is to be noted that, in a case where the current machine is registered according to its MAC address, the steps S336-S338 shown in FIG. 8 may be performed.

Then, status data of the supplies of the current data included in the status change data are transferred to the status of the machine data table 12 (update of machine data table 12) (S406). Then, it is determined whether there are any machines having short supplies (i.e. supplies having a "Ne (Near-End)" status or a "E (End)" status) based on the status of the current machine registered in the machine data table 12 (S407). In a case where a supply of the current machine is short (Yes in S407), the order supporting program 11 refers to the machine data table 12 and determines whether the value of the mail flag of the entry of the current machine (hereinafter referred to as "current entry") is registered as "Yes" (S408). In this example, the mail flag is registered as "Yes" when a shortage report mail 250 is transmitted. In other words, the value of the mail flag registered as "Yes" indicates that a shortage report mail 250 corresponding to the current machine has been transmitted previously or in the past.

In a case where the mail flag is "Yes" (Yes in S408), the order supporting program 11 checks (inspects) for double transmission of the shortage report mail 250 (S409). In this example, the checking of double transmission is a process for determining whether shortage report mail 250 of the same content has been redundantly transmitted (this process is described in detail below). When the probability of double transmission of shortage report mail 250 is low according to the double transmission check, it is determined that the shortage report mail 250 is to be transmitted ("transmit" in S409). Thereby, the mail flag is registered as "Yes" and the shortage report mail 250 corresponding to the current machine is transmitted (S411). This process of Step S411 corresponds to Step S110 of FIG. 10. It is to be noted that, in a case where a shortage for plural supplies is detected, a single shortage report mail 250 including data corresponding to the plural supplies is transmitted, thereby reducing the number of shortage report mails 250 transmitted to the user and relieving the user of various complications.

When the probability of redundant (double) transmission of shortage report mail 250 is high according to the double transmission check, it is determined that the shortage report mail 250 is not to be transmitted ("not transmitted" in S409). Accordingly, the processes performed on the current machine are finished without transmitting the shortage report mail 250.

In a case where the mail flag is registered as "No" (No in S408), there is no possibility of double transmission. Accordingly, the mail flag is registered as "Yes" without checking for double transmission (S410) and a shortage report mail is transmitted (S411).

In a case where the order supporting program 11 determines that there is no shortage of supplies for the current machine (No in S407), there is no need to transmit a shortage report mail 250. Accordingly, the mail flag is registered as "No" (S412). Thus, the process for the current machine is finished without transmitting the shortage supply mail.

When the processes performed in the above-described Steps S403-S412 are completed for all of the machines corresponding to the status change data (Yes in S402), the order supporting program 11 transmits a message to the monitor service indicating that status change data have been properly processed (success) (S414) and finishes the operation. This Step S414 corresponds to Step S111 shown in FIG. 10. It is to be noted that, in a case where user authentication fails (No in Step S401), a message indicating an error is transmitted to the monitor service 212 without updating the machine data table 12 (S413).

Figure 18:
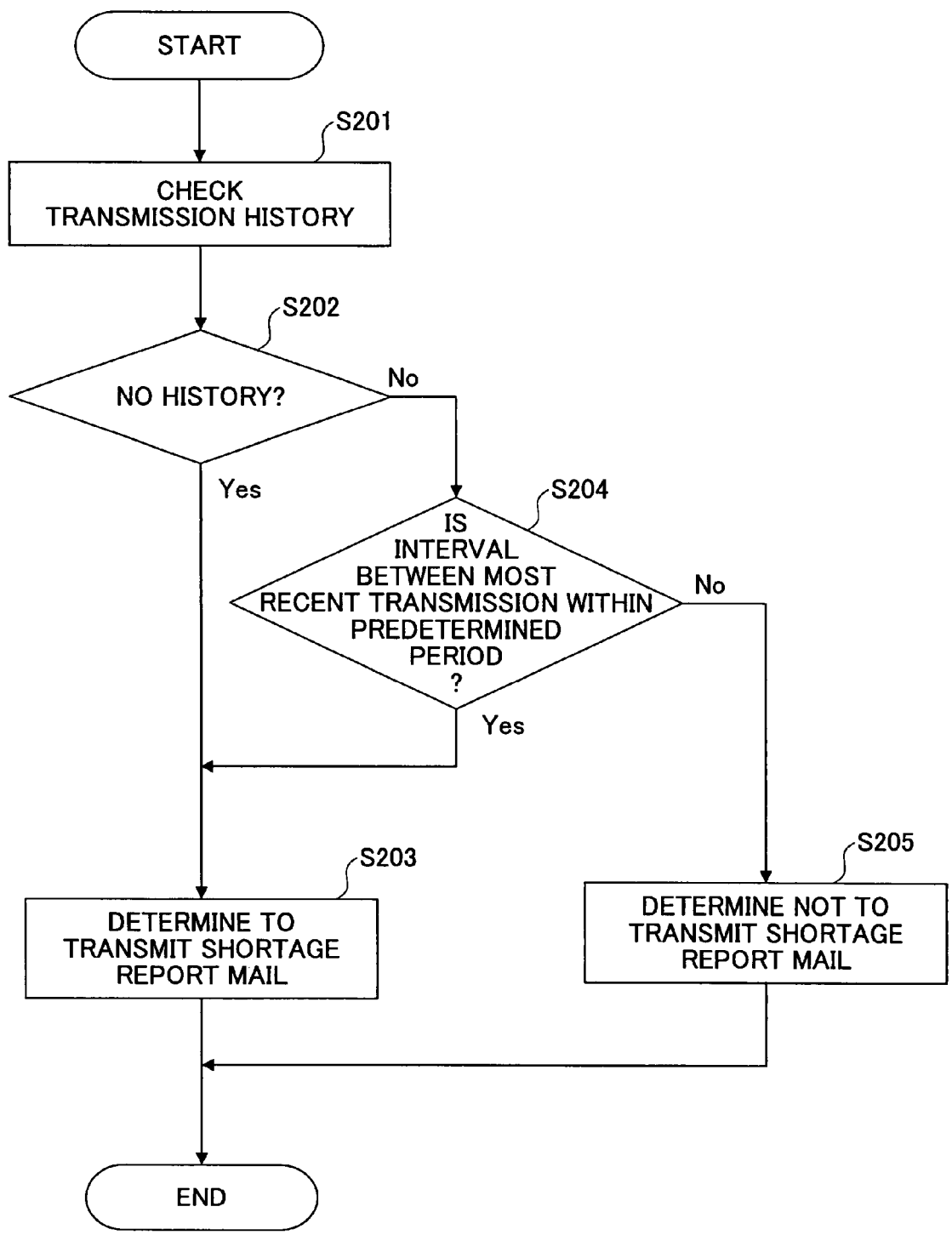
FIG. 18 is for describing a process of checking for redundant transmission of shortage report mail according to an embodiment of the present invention.

Next, an operation of S409 shown in FIG. 17 is described in further detail. FIG. 18 is for describing a process of checking for redundant transmission of shortage report mail.

Since the monitor service 212 transmits the status change data based on the report flags of the cache table 27, the monitor service 212 basically does not redundantly transmit status change data of the same content. However, in a case where the supply is a toner, there may be a case where the end of toner is detected even though some toner is still remaining in the toner bottle. When the toner bottle is mounted again after the user shakes the toner bottle, the end of toner may be detected again after some while with respect to the same toner bottle. In this situation, the report flag first changes from "end" to "normal" and then changes to "end" even though the toner bottle is actually not yet replaced. The monitor service 212 may nevertheless redundantly transmit status change data for reporting end of toner. This causes a shortage report mail 250 to be redundantly transmitted to the user. Unless the user recognizes this redundancy, the user is likely to inadvertently make a second order for the same toner bottle. In order to prevent this from occurring, the order supporting program 11 is configured to perform the below-described processes.

First, the order supporting program 121 refers to a serial number of the machine 30 included in the status change data received from the monitor service 212 and checks the most recent (previous) time and date of transmitting a shortage report mail of the machine 30 according to the transmission history of the shortage report mail (S201).

In a case where there is no record indicating transmission of a shortage report mail corresponding to the machine 30 in the transmission history of the shortage report mail (Yes in S202), the order supporting program 11 determines to transmit the shortage report mail (S203). This is because shortage report mail corresponding to the machine 30 has not yet been transmitted. Thus, it is unlikely that the shortage report mail will be transmitted redundantly.

In a case where there is a record indicating transmission of a shortage report mail corresponding to the machine 30 (No in S202), the order supporting program 11 determines whether a predetermined time has elapsed since the most recent transmission (S204). In a case where a predetermined time has elapsed, the order supporting program 11 determines to transmit the shortage report mail (S203). In a case where a predetermined time has not elapsed, the order supporting program 11 determines not to transmit the shortage report mail since there is a possibility that the transmission of the shortage report mail would be redundant (S205).

In FIG. 18, although the above-described process of checking for redundant transmission of shortage report mail is performed by referring to the passing of time, the process may alternatively be performed by referring to a total counter recorded as the transmission history. In this case, the order supporting program 11 may determine not to transmit a shortage report mail when a difference with respect to the total counter is no greater than a predetermined threshold. Alternatively, the transmission history of the shortage report mail may be periodically deleted whenever a predetermined time elapses. Accordingly, the order supporting program 11 may determine not to transmit a shortage report mail in a case where a shortage report mail corresponding to the same machine 30 is included in the transmission history.

Next, functions of the UI application 211 of the monitor program 21 are described. The UI application 211 is a program for displaying data including the various settings (e.g., period for obtaining machine data) of the monitor service 212 on a screen (hereinafter referred to as "setting screen") or displaying a screen indicating monitor data of the machines 30 obtained from the monitor service 212 (hereinafter referred to as "monitoring screen").

Figure 19:
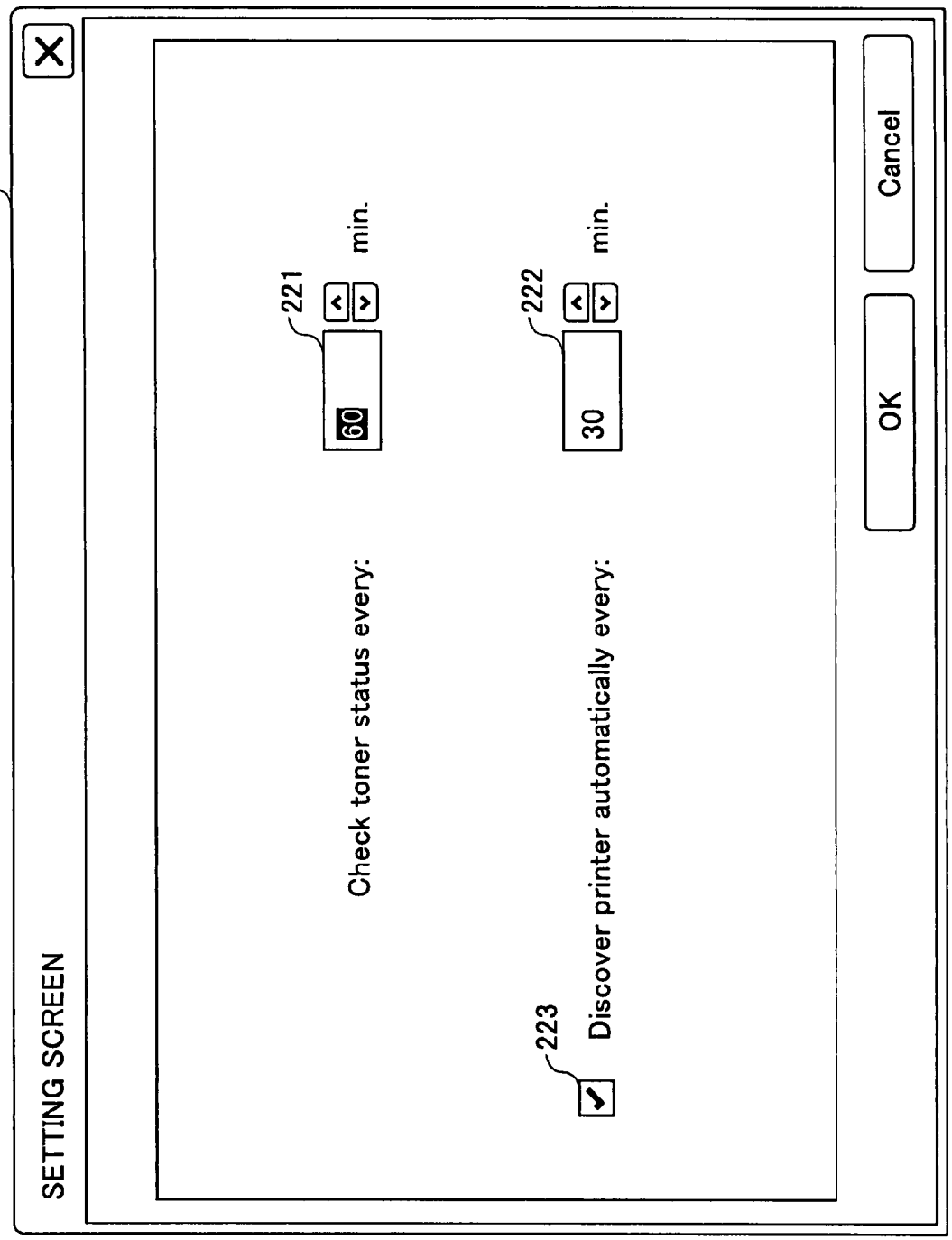
FIG. 19 shows an example of a setting screen according to an embodiment of the present invention.

The UI application 211 displays a setting screen (as described below) in accordance with instructions from the user. FIG. 19 shows an example of the setting screen according to an embodiment of the present invention. In the setting screen 220 shown in FIG. 19, the monitor service 212 may be set to periodically obtain (polling) machine data from the monitor machines (indicated with reference numeral 221 of FIG. 19) or to automatically search (discover) machines in the network 50 (indicated with reference numeral 222 of FIG. 19). The former corresponds to a period for conducting the process in Step S104 of FIG. 10. The latter corresponds to a period for conducting the process in Step S31 of FIG. 3. It is to be noted that the settings for the latter case may be invalidated with the check box 223 shown in FIG. 19. That is, the automatic searching for machines 30 is not conducted in a case where the check-mark in the check box is removed.

Figure 20:
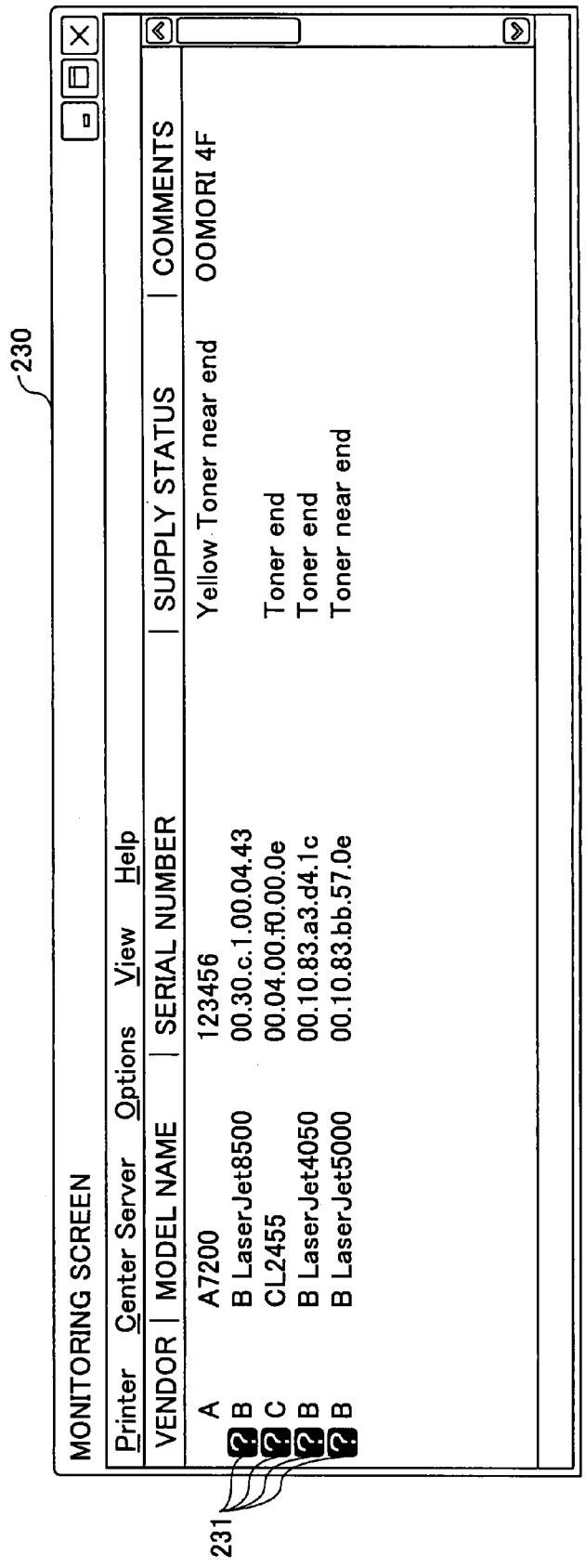
FIG. 20 shows an example of a monitoring screen according to an embodiment of the present invention.

The UI application 211 displays a monitoring screen (as described below) in accordance with instructions from the user. FIG. 20 shows an example of the monitoring screen according to an embodiment of the present invention. The monitoring screen 230 is for displaying data obtained from the cache table 27 by the UI application 211. Therefore, the data managed in the cache table 27 (i.e. vendor name, model name, serial number, supply status, comments, etc. corresponding to each machine 30) are displayed. With the monitoring screen 230, the user can confirm the status of the supplies of each monitor machine at a given timing. The question mark "?" denoted with reference numeral 231 in FIG. 20 indicates failure in obtaining machine data (polling) of the machines corresponding to the question marks. For example, these question marks may appear in a case where the monitor machine 30 is not yet activated or a case where the machine 30 is disconnected from the network 50.

With the above-described order supporting system 1 according to an embodiment of the present invention, convenience and profitability can be attained for the user (customer) of the machines 30, the distributor of the machines 30, and the manufacturer of the machines 30.

That is, shortage of supplies of the machines 30 can automatically be detected and a shortage report mail can be automatically transmitted to a terminal of the user. As a result, by clicking the URL indicated in the shortage report mail, an order page 260 can be displayed to the user for allowing the user to easily order the short supply through the order page 260. Accordingly, the user does not need to identify the short supply corresponding to the machine 30 or go to a mass retailer for purchasing the short supply. Thereby, the cost for obtaining the short supply can be reduced.

From the standpoint of the distributor, the distributor can obtain part of the profit gained by selling the supply. This expands the profit sources for the distributor.

From the standpoint of the manufacturer, the manufacturer can provide an incentive to the distributor so that the distributor would wish to sell the manufacturer's machine rather than another company's machine or an incentive so that the distributor would wish to purchase the manufacturer's machines. That is, in a case where the supply sold through the order supporting system 1 is manufactured by a manufacturer, the manufacturer can, for example, set a higher return rate for the distributor or set the return rate for other distributors as "0" so that the distributor can gain more profit by selling the manufacturer's machine rather than another company's machine 30. Furthermore, from the aspect of the user, the user can receive proficient services (e.g., identifying the color of toner that is short) by purchasing the machine of the manufacturer.

Furthermore, the period in which each machine 30 is used can be anticipated to some degree by storing machine data of the user. As a result, the manufacturer can promote purchasing a replacement or effectively coordinate with other new sales activities. As shown in FIG. 20, the monitor service 212 may be set to periodically obtain (polling) machine data from the monitor machines (indicated with reference numeral 221 of FIG. 19) or to automatically search (discover) machines in the network 50 (indicated with reference numeral 222 of FIG. 19).

It is to be noted that, although the above-described embodiment of the present invention describes an exemplary case where the distributor of the machine concludes a contract with the user for registering in the order supplying system, the distributor for concluding a contract with the user is not limited to one who has sold a machine of the manufacturer. For example, even in a case where a machine is not sold by a distributor, the manufacturer may assign a distributor ID of the order supporting system 1 to the distributor. In this case, even if the distributor has no part in selling the machine, the distributor can still obtain profit by selling the supplies of the machine.

Further, the present invention is not limited to these embodiments, but variations and modifications may be made without departing from the scope of the present invention.

The present application is based on Japanese Priority Application Nos. 2006-153844 and 2007-093638 filed on Jun. 1, 2006, and Mar. 30, 2007, with the Japanese Patent Office, the entire contents of which are hereby incorporated by reference.

What is claimed is:

1. An order supporting system comprising:
    a machine monitoring apparatus including
        a status data obtaining part for repetitively obtaining status data of a plurality of supplies of a plurality of machines connected to a network,
        a status data storing part for storing the status data obtained by the status data obtaining part, a status change detecting part for detecting change in the status of the supply by comparing the status data stored in the status data storing part and new status data that is newly obtained by the status data obtaining part, and a status data transmitting part for transmitting status data corresponding to the supply of the machine from which status change is detected by the status change detecting part; and an order supporting apparatus for receiving the status data transmitted from the status data transmitting part via the network and transmitting an electronic mail to a mail address associated to the machine corresponding to the transmitted status data in accordance with the received status data; and wherein the status data storing part stores the status data in correspondence with each supply or each machine, and flag data indicating a first flag value or a second flag value in correspondence with each supply, wherein the status change detecting part sets the flag data to the first flag value when detecting a status change in the supply corresponding to the flag data, wherein the status data transmitting part transmits the status data corresponding to the flag data indicated as the first flag data; and wherein the machine monitoring apparatus sets the flag data to the second flag value when transmitting status data of the supply corresponding to the flag data; and wherein the machine monitoring apparatus further includes a machine searching part for searching for machines connected to the network, and a searched machine data list transmitting part for transmitting a machine data list including status data of the machines found by the machine searching part, wherein the order supporting apparatus includes a machine data list storing part for storing the machine data list, and a target machine selecting part for selecting a machine targeted for obtaining status data from the machine data list.

2. The order supporting system as claimed in claim 1, wherein the electronic mail is inscribed with a URL indicating a Web page dedicated to ordering a supply indicated in the received status data.

3. The order supporting system as claimed in claim 1, wherein the status data obtaining part is configured to request for a list to the order supporting apparatus,
   wherein the list is indicative of one or more machines designated by the order supporting apparatus,
   wherein the order supporting apparatus is configured to transmit the list to the status data obtaining part, and
   wherein the status data obtaining part is configured to obtain the status data of the plural machines in accordance with the one or more machines indicated in the list.

4. The order supporting system as claimed in claim 1, wherein the machine searching part is configured to repetitively search for machines connected to the network and transmit a machine data list including status data of the machines found by the search to the order supporting apparatus, wherein the target machine selecting part is configured to compare a first machine data list stored in the machine data list storing part and a second machine data list that is newly found by the search and select a machine in the second data list that is not included in the first machine data list.

5. An order supporting method comprising the steps of:
   causing a first computer to execute the steps of
      a) repetitively obtaining status data of a plurality of supplies of a plurality of machines connected to a network,
      b) storing the status data obtained in step a),
      c) detecting change in the status of the supply by comparing the status data stored in a status data storing part and new status data that is newly obtained in step a), and
      d) transmitting status data corresponding to the supply of the machine from which status change is detected in step c); and
   causing a second computer to execute the steps of
      e) receiving the status data transmitted in step d) via the network, and
      f) transmitting an electronic mail to a mail address associated to the machine corresponding to the transmitted status data in accordance with the received status data; and
   wherein step b) includes a step of storing the status data in correspondence with each supply or each machine, and flag data indicating a first flag value or a second flag value in correspondence with each supply, wherein step c) includes a step of setting the flag data to the first flag value when detecting a status change in the supply corresponding to the flag data, wherein step d) includes a step of transmitting the status data corresponding to the flag data indicated as the first flag data; and
   wherein the first computer executes a step of setting the flag data to the second flag value when transmitting status data of the supply corresponding to the flag data; and
   wherein the first computer further executes the steps of g) searching for machines connected to the network, and h) transmitting a machine data list including status data of the machines found by step g); wherein the second computer further executes the steps of i) storing the machine data list, and j) selecting a machine targeted for obtaining status data from the machine data list.

6. The order supporting method as claimed in claim 5, wherein the electronic mail is inscribed with a URL indicating a Web page dedicated to ordering a supply indicated in the received status data.

7. The order supporting method as claimed in claim 5, wherein step a) includes a step of making a request for a list to an order supporting apparatus,
   wherein the list is indicative of one or more machines designated by the order supporting apparatus,
   wherein the order supporting apparatus is configured to transmit the list to the status data obtaining part, and
   wherein the status data obtaining part is configured to obtain the status data of the plural machines in accordance with the one or more machines indicated in the list.

8. The order supporting method as claimed in claim 5, wherein step g) includes a step of repetitively searching for machines connected to the network and transmitting a machine data list including status data of the machines to an order supporting apparatus, wherein step j) includes a step of comparing a first machine data list stored in step i) and a second machine data list that is newly found by the search and selecting a machine in the second data list that is not included in the first machine data list.

9. A non-transitory computer-readable recording medium on which a program for causing first and second computers to execute an order supporting method is encoded, the order supporting method comprising the steps of:
   causing the first computer to execute the steps of
      a) repetitively obtaining status data of a plurality of supplies of a plurality of machines connected to a network,
      b) storing the status data obtained in step a), c) detecting change in the status of the supply by comparing the status data stored in a status data storing part and new status data that is newly obtained in step a), and d) transmitting status data corresponding to the supply of the machine from which status change is detected in step c); and causing the second computer to execute the steps of e) receiving the status data transmitted in step d) via the network, and f) transmitting an electronic mail to a mail address associated to the machine corresponding to the transmitted status data in accordance with the received status data; and wherein step b) includes a step of storing the status data in correspondence with each supply or each machine, and flag data indicating a first flag value or a second flag value in correspondence with each supply, wherein step c) includes a step of setting the flag data to the first flag value when detecting a status change in the supply corresponding to the flag data, wherein step d) includes a step of transmitting the status data corresponding to the flag data indicated as the first flag data; and wherein the first computer executes a step of setting the flag data to the second flag value when transmitting status data of the supply corresponding to the flag data; and wherein the first computer further executes the steps of g) searching for machines connected to the network, and h) transmitting a machine data list including status data of the machines found by step g); wherein the second computer further executes the steps of i) storing the machine data list, and i) selecting a machine targeted for obtaining status data from the machine data list.

* * * * *